United States Patent
Smith et al.

(10) Patent No.: US 11,822,918 B2
(45) Date of Patent: Nov. 21, 2023

(54) CODE SEARCH AND CODE NAVIGATION

(71) Applicant: Affirm, Inc., San Francisco, CA (US)

(72) Inventors: Adam Smith, San Francisco, CA (US); Tarak Upadhyaya, San Francisco, CA (US); Juan Lozano, San Francisco, CA (US); Daniel Hung, San Francisco, CA (US)

(73) Assignee: Affirm, Inc., San Francisco, CA (US)

( * ) Notice: Subject to any disclaimer, the term of this patent is extended or adjusted under 35 U.S.C. 154(b) by 1 day.

(21) Appl. No.: 16/601,402

(22) Filed: Oct. 14, 2019

(65) Prior Publication Data

US 2020/0117446 A1    Apr. 16, 2020

Related U.S. Application Data

(60) Provisional application No. 62/745,289, filed on Oct. 13, 2018.

(51) Int. Cl.
| | |
|---|---|
| G06F 9/44 | (2018.01) |
| G06F 8/71 | (2018.01) |
| G06F 8/75 | (2018.01) |
| G06F 16/903 | (2019.01) |
| G06N 3/08 | (2023.01) |
| G06F 40/30 | (2020.01) |
| G06F 18/22 | (2023.01) |

(52) U.S. Cl.
CPC ............ *G06F 8/71* (2013.01); *G06F 8/75* (2013.01); *G06F 16/903* (2019.01); *G06F 18/22* (2023.01); *G06F 40/30* (2020.01); *G06N 3/08* (2013.01)

(58) Field of Classification Search
CPC ........ G06F 8/75; G06F 16/903; G06F 40/30; G06F 8/71; G06F 18/22; G06K 9/6215; G06N 3/08
USPC ................................ 717/101–103, 120, 123
See application file for complete search history.

(56) References Cited

U.S. PATENT DOCUMENTS

| | | | |
|---|---|---|---|
| 7,587,387 B2 * | 9/2009 | Hogue | G06F 16/951 |
| 10,809,984 B2 * | 10/2020 | Mizrahi | G06F 16/951 |
| 2018/0150459 A1 * | 5/2018 | Farid | G06F 16/24578 |

OTHER PUBLICATIONS

Mishne et al., "Typestate-Based Semantic Code Search over Partial Programs", 2012, ACM, 20 pages (Year: 2012).*
Cade Metz, "AI Is Transforming Google Search. The Rest of the Web Is Next", 2016, retrieved from https://www.wired.com/2016/02/ai-is-changing-the-technology-behind-google-searches/, 5 pages. (Year: 2016).*

(Continued)

*Primary Examiner* — Ted T. Vo
(74) *Attorney, Agent, or Firm* — Burr & Forman LLP

(57) ABSTRACT

A system and method may provide assistance to programmers during programming to reduce the number of routine tasks that must be performed. In some aspects, the system may provide for searching a corpus of source code based on keyword or natural language search input. Search results including code entities and snippets of code that are described by the search input are then provided as search results. Some embodiments relate to using a neural network encoder to generate tensor embeddings of source code and related text in a joint tensor space. Relatedness between embeddings in this joint tensor space for text and associated source code is used in some embodiments to facilitate code search.

25 Claims, 20 Drawing Sheets

(56) References Cited

OTHER PUBLICATIONS

Hjaltason et al., "Index-Driven Similarity Search in Metric Spaces", 2003, ACM, pp. 517-580. (Year: 2003).*
Kim et al., "FaCoY—A Code-to-Code Search Engine", Jun. 2018, ACM, pp. 946-957. (Year: 2018).*
Zagoris et al., "www.MMRetrieval.net: A Multimodal Search Engine", 2010, ACM, 2 pages. (Year: 2010).*

* cited by examiner

CODE SEARCH AND CODE NAVIGATION

CROSS-REFERENCE TO RELATED APPLICATIONS

This application claims the benefit of U.S. Provisional Patent Application No. 62/745,289, filed Oct. 13, 2018, which is hereby incorporated by reference in its entirety.

FIELD OF INVENTION

The present disclosure relates generally to methods and systems for code search and code navigation.

BACKGROUND

Programmers may reference examples of source code while writing new programs. For example, documentation sources may be referenced by a programmer to see examples of how to use a particular library or software package. Similarly, programmers may reference source code that they previously wrote, or someone else previously wrote that is related to the program they are writing to learn new techniques and features of a programming language or software package.

Websites that provide for discussions about programming may also be referenced by a programmer. For example, Stack Overflow and GitHub are websites that may be referenced by programmers when programming. These sites and others may include snippets of code along with discussions about the snippets of code that may be valuable references to a programmer.

SUMMARY

In some embodiments, a programming co-pilot system is provided that may integrate with a code editor. The programming co-pilot system may provide functionality such as code search. In embodiments described herein, the programming co-pilot system receives a search query and returns relevant pieces of code that are described by the search query. In some embodiments, the search query may be a keyword-based search query, and in some embodiments the search query may include natural language search terms.

Some embodiments relate to using a neural network encoder to generate tensor embeddings of source code and related text in a joint tensor space. Relatedness between embeddings in this joint tensor space for text and associated source code is used in some embodiments to facilitate code search. In this way, the programming co-pilot system may find search results that are responsive to the intent expressed by the search query.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for code entity search, including: providing a code entity; identifying a source body related to the code entity; receiving the source body. The computer-implemented method also includes selecting references to other code entities in the source body as potential keywords; selecting comments or portions of comments in the source body as potential keywords, identifying documentation related to the code entity, receiving the documentation, selecting portions of the documentation as potential keywords, identifying additional textual sources related to the code entity, receiving the additional textual sources, selecting portions of the additional textual sources as potential keywords, selecting a subset of potential keywords as search keywords for the code entity, receiving a search query including one or more search terms, determining a correspondence between the search query and the search keywords, determining that the code entity is responsive to the search query, and transmitting the code entity in response to determining that the code entity is responsive to the search query. Other embodiments of this aspect include corresponding computer systems, apparatus, and computer programs recorded on one or more computer storage devices, each configured to perform the actions of the methods.

One general aspect includes a computer-implemented method for code entity search, including: providing a code entity. The computer-implemented method also includes identifying a natural language text related to the code entity. The computer-implemented method also includes receiving the natural language text related to the code entity. The computer-implemented method also includes processing the natural language text related to the code entity to produce a training dataset. The computer-implemented method also includes jointly training a code entity neural network encoder and a natural language neural network encoder to produce an embedding for the code entity and embeddings for the training dataset in a joint embedding space. The computer-implemented method also includes receiving a natural language search query. The computer-implemented method also includes determining an embedding in the joint embedding space for the natural language search query with the trained natural language neural network encoder. The computer-implemented method also includes determining a similarity between the embedding in the joint embedding space for the natural language search query and the code entity. The computer-implemented method also includes determining that the similarity between the embedding in the joint embedding space for the natural language search query and the code entity satisfies a search condition. The computer-implemented method also includes transmitting the code entity in response to determining that the similarity between the embedding in the joint embedding space for the natural language search query and the code entity satisfies a search condition. Other embodiments of this aspect include corresponding computer systems, apparatus, and computer programs recorded on one or more computer storage devices, each configured to perform the actions of the methods.

One general aspect includes a computer-implemented method for code snippet search, including: providing a code snippet. The computer-implemented method also includes selecting references to other code entities in the code snippet as potential keywords. The computer-implemented method also includes selecting comments or portions of comments in the code snippet as potential keywords. The computer-implemented method also includes identifying documentation related to the code snippet. The computer-implemented method also includes receiving the documentation. The computer-implemented method also includes selecting portions of the documentation as potential keywords. The computer-implemented method also includes identifying additional textual sources related to the code snippet. The computer-implemented method also includes receiving the additional textual sources. The computer-implemented method also includes selecting portions of the additional textual sources as potential keywords. The computer-implemented method also includes selecting a subset of potential keywords as search keywords for the code snippet. The computer-implemented method also includes receiving a search query including one or more search terms. The computer-implemented method also includes determining a correspondence between the search query and the search keywords. The computer-implemented method also includes determining that the code snippet is responsive to the search query; and transmitting the code snippet in response to determining that the code snippet is responsive to the search query. Other embodiments of this aspect include corresponding computer systems, apparatus, and computer programs recorded on one or more computer storage devices, each configured to perform the actions of the methods.

One general aspect includes a computer-implemented method for code snippet search, including: providing a code snippet. The computer-implemented method also includes identifying a natural language text related to the code snippet. The computer-implemented method also includes receiving the natural language text related to the code snippet. The computer-implemented method also includes processing the natural language text related to the code snippet to produce a training dataset. The computer-implemented method also includes jointly training a code snippet neural network encoder and a natural language neural network encoder to produce an embedding for the code snippet and embeddings for the training dataset in a joint embedding space. The computer-implemented method also includes receiving a natural language search query. The computer-implemented method also includes determining an embedding in the joint embedding space for the natural language search query with the trained natural language neural network encoder. The computer-implemented method also includes determining a similarity between the embedding in the joint embedding space for the natural language search query and the code snippet. The computer-implemented method also includes determining that the similarity between the embedding in the joint embedding space for the natural language search query and the code snippet satisfies a search condition. The computer-implemented method also includes transmitting the code entity in response to determining that the similarity between the embedding in the joint embedding space for the natural language search query and the code snippet satisfies a search condition. Other embodiments of this aspect include corresponding computer systems, apparatus, and computer programs recorded on one or more computer storage devices, each configured to perform the actions of the methods.

BRIEF DESCRIPTION OF THE DRAWINGS

The present disclosure will become better understood from the detailed description and the drawings, wherein.

DETAILED DESCRIPTION

Figure 1:
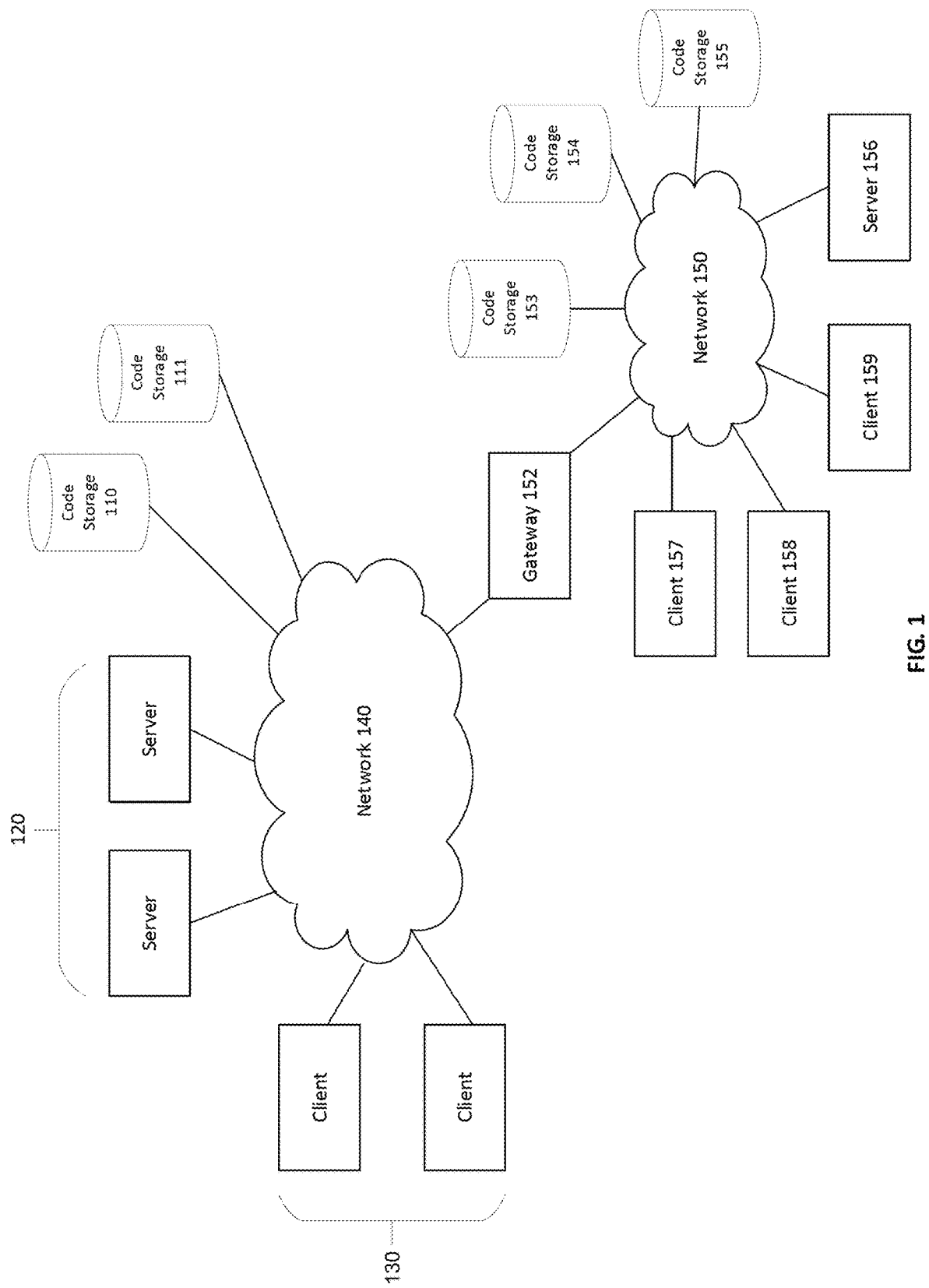
FIG. 1 illustrates an exemplary network environment that may be used in an embodiment.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 is a block diagram illustrating an exemplary network environment that may be used in an embodiment. The network environment may include one or more clients and servers connected via a network 140. The network 140 may include a local area network (LAN), a wide area network (WAN), a telephone network, such as the Public Switched Telephone Network (PSTN), an intranet, the Internet, or a combination of networks. The network may include external code storage 110, 111 that store computer code, such as source code. Some external code storage 110, 111 may be globally accessible to any entity on the network 140. Other external code storage 110, 111 may be private and require login-in and authentication to access. The network 140 may include various entities such as servers 120 and clients 130.

Local network 150 may connect to network 140 through gateway 152. In some embodiments, the local network 150 may be private and access controlled so that entities on the network 140 cannot generally access the resources on local network 140. However, entities on the local network 150 may access and share at least some of the resources on the local network 150. Code storage 153 may comprise code stored on the local network 150 after having been web scraped from external code sources 110, 111. Code storage 154 may exist on the local network 150 and may store code from a team of programmers working from clients 157, 158, 159 on the local network 150. In an embodiment, a code storage 156 is an individual code storage that stores code of just one of the programmers on the team. The code storage 156 may be separate from code storage 154 or may be, for example, a subset of code storage 154. In some embodiments, a code storage comprises a codebase, which is a collection of code for building one or a set of software systems, applications, or software components. Code storage may be any kind of storage. In some embodiments, code storage comprises a database. A database is any kind of storage and no particular type of database is required. For example, a database may comprise storage of files in memory or permanent storage.

Additional servers, clients, computer systems, and local networks may be connected to network 140. It should be understood that where the terms server, client, or computer system are used, this includes the use of networked arrangements of multiple devices operating as a server, client, or computer system. For example, distributed or parallel computing may be used.

Figure 2A:
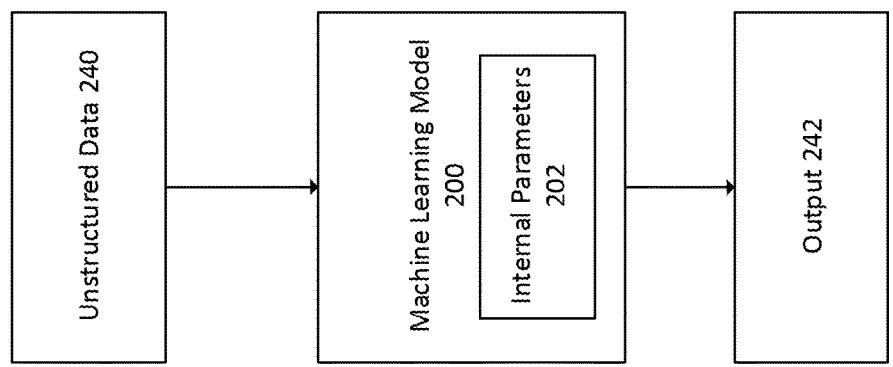
FIGS. 2A-2B illustrate an exemplary machine learning model that may be used in an embodiment.
Figure 2A:
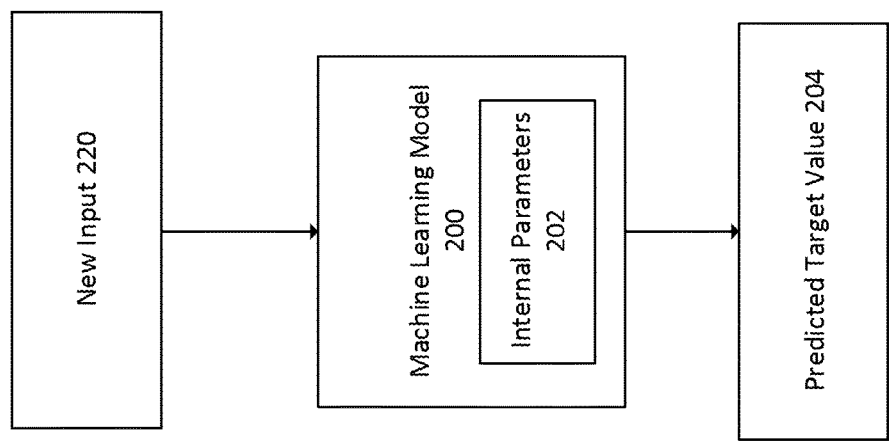
Figure 2A:
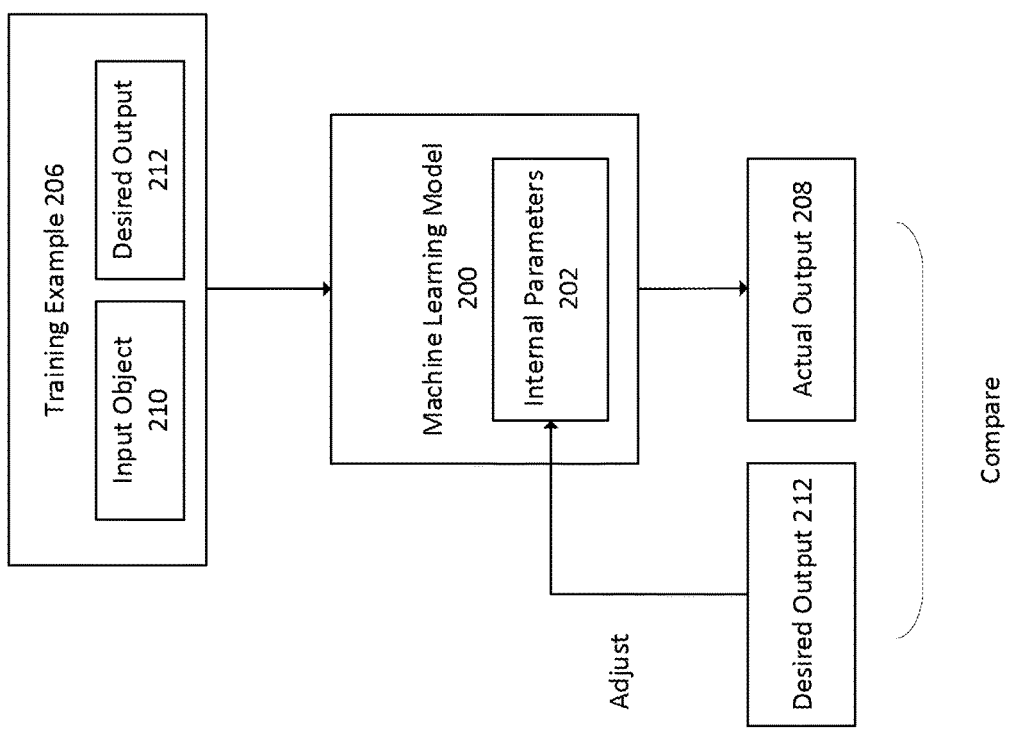

FIG. 2A illustrates an exemplary machine learning model 200. A machine learning model 200 may be a component, module, computer program, system, or algorithm. Some embodiments herein use machine learning for code completion or predictive editing. Machine learning model 200 may be used as the model to power those embodiments described herein. Machine learning model 200 is trained with training examples 206, which may comprise an input object 210 and a desired object value 212. The input object 210 and desired object value 212 may be tensors. A tensor is a matrix of n dimensions where n may be any of 0 (a constant), 1 (an array), 2 (a 2D matrix), 3, 4, or more.

The machine learning model 200 has internal parameters that determine its decision boundary and that determine the output that the machine learning model 200 produces. After each training iteration, comprising inputting the input object 210 of a training example in to the machine learning model 200, the actual output 208 of the machine learning model 200 for the input object 210 is compared to the desired output value 212. One or more internal parameters 202 of the machine learning model 200 may be adjusted such that, upon running the machine learning model 200 with the new parameters, the produced output 208 will be closer to the desired output value 212. If the produced output 208 was already identical to the desired output value 212, then the internal parameters 202 of the machine learning model 200 may be adjusted to reinforce and strengthen those parameters that caused the correct output and reduce and weaken parameters that tended to move away from the correct output.

The machine learning model 200 output may be, for example, a numerical value in the case of regression or an identifier of a category in the case of classifier. A machine learning model trained to perform regression may be referred to as a regression model and a machine learning model trained to perform classification may be referred to as a classifier. The aspects of the input object that may be considered by the machine learning model 200 in making its decision may be referred to as features.

After machine learning model 200 has been trained, a new, unseen input object 220 may be provided as input to the model 200. The machine learning model 200 then produces an output representing a predicted target value 204 for the new input object 220, based on its internal parameters 202 learned from training.

Machine learning model 200 may be, for example, a neural network, support vector machine (SVM), Bayesian network, logistic regression, logistic classification, decision tree, ensemble classifier, or other machine learning model. Machine learning model 200 may be supervised or unsupervised. In the unsupervised case, the machine learning model 200 may identify patterns in unstructured data 240 without training examples 206. Unstructured data 240 is, for example, raw data upon which inference processes are desired to be performed. An unsupervised machine learning model may generate output 242 that comprises data identifying structure or patterns.

A neural network may be comprised of a plurality of neural network nodes, where each node includes input values, a set of weights, and an activation function. The neural network node may calculate the activation function on the input values to produce an output value. The activation function may be a non-linear function computed on the weighted sum of the input values plus an optional constant. In some embodiments, the activation function is logistic, sigmoid, or a hyperbolic tangent function. Neural network nodes may be connected to each other such that the output of one node is the input of another node. Moreover, neural network nodes may be organized into layers, each layer comprising one or more nodes. An input layer may comprise the inputs to the neural network and an output layer may comprise the output of the neural network. A neural network may be trained and update its internal parameters, which comprise the weights of each neural network node, by using backpropagation.

A convolutional neural network (CNN) may be used in some embodiments and is one kind of neural network and machine learning model. A convolutional neural network may include one or more convolutional filters, also known as kernels, that operate on the outputs of the neural network layer that precede it and produce an output to be consumed by the neural network layer subsequent to it. A convolutional filter may have a window in which it operates. The window may be spatially local. A node of the preceding layer may be connected to a node in the current layer if the node of the preceding layer is within the window. If it is not within the window, then it is not connected. A convolutional neural network is one kind of locally connected neural network, which is a neural network where neural network nodes are connected to nodes of a preceding layer that are within a spatially local area. Moreover, a convolutional neural network is one kind of sparsely connected neural network, which is a neural network where most of the nodes of each hidden layer are connected to fewer than half of the nodes in the subsequent layer.

A recurrent neural network (RNN) may be used in some embodiments and is one kind of neural network and machine learning model. A recurrent neural network includes at least one back loop, where the output of at least one neural network node is input into a neural network node of a prior layer. The recurrent neural network maintains state between iterations, such as in the form of a tensor. The state is updated at each iteration, and the state tensor is passed as input to the recurrent neural network at the new iteration.

In some embodiments, the recurrent neural network is a long short-term (LSTM) memory neural network. In some embodiments, the recurrent neural network is a bi-directional LSTM neural network.

A feed forward neural network is another type of a neural network and has no back loops. In some embodiments, a feed forward neural network may be densely connected, meaning that most of the neural network nodes in each layer are connected to most of the neural network nodes in the subsequent layer. In some embodiments, the feed forward neural network is a fully-connected neural network, where each of the neural network nodes is connected to each neural network node in the subsequent layer.

A gated graph sequence neural network (GGSNN) is a type of neural network that may be used in some embodiments. In a GGSNN, the input data is a graph, comprising nodes and edges between the nodes, and the neural network outputs a graph. The graph may be directed or undirected. A propagation step is performed to compute node representations for each node, where node representations may be based on features of the node. An output model maps from node representations and corresponding labels to an output for each node. The output model is defined per node and is a differentiable function that maps to an output.

Neural networks of different types or the same type may be linked together into a sequential or parallel series of neural networks, where subsequent neural networks accept as input the output of one or more preceding neural networks. The combination of multiple neural networks may comprise a single neural network and may be trained from end-to-end using backpropagation from the last neural network through the first neural network.

Figure 2B:
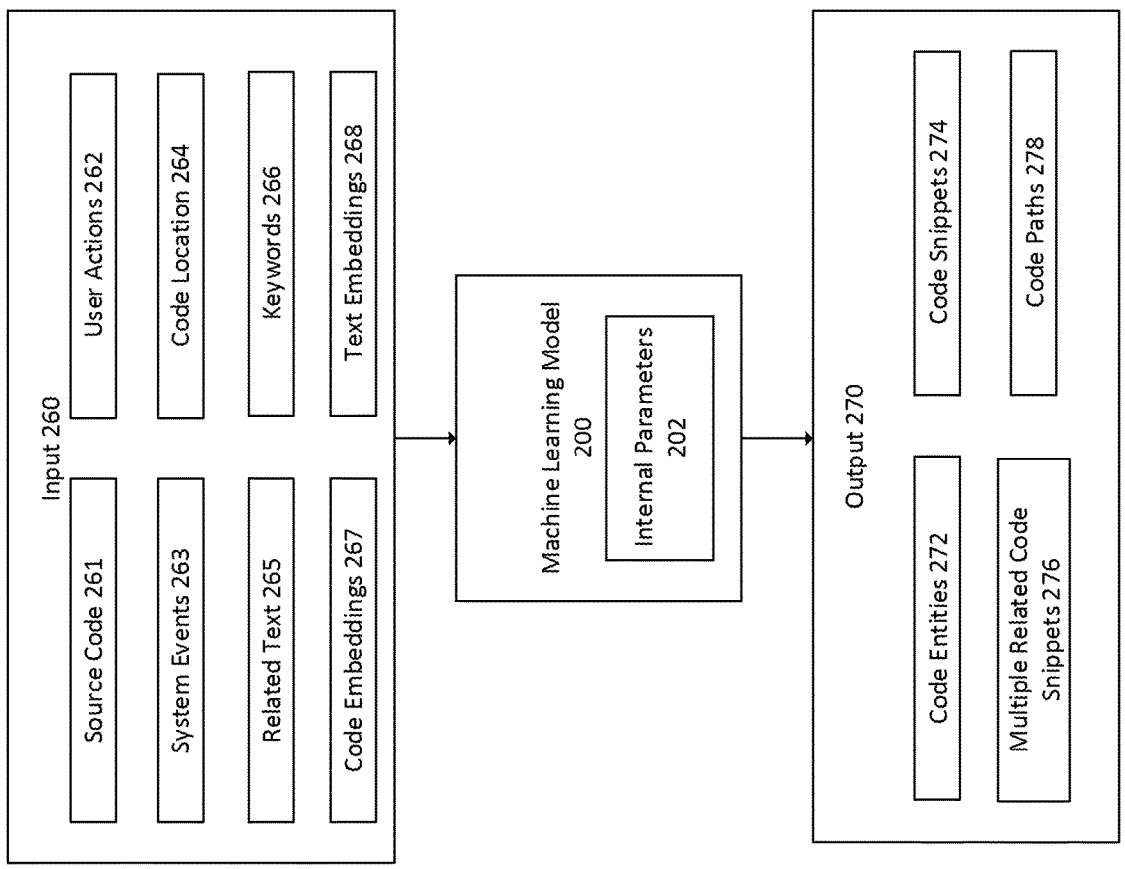

FIG. 2B illustrates use of the machine learning model 200 to perform inference on input 260 comprising data relevant to a programming co-pilot system 340. Input 260 may comprise any of source code 261, user actions 262, system events 263, the location of code 264 such as in external code storage, team code storage, or personal code storage, related text 265 that relates to source code 261, keywords 266, code embeddings 267, text embeddings 268, or other data. The machine learning model 200 performs inference on the data based on its internal parameters 202 that are learned through training. The machine learning model 200 generates an output 270 comprising information or data relevant to helping a programmer, such as code entities 272, code snippets 274, multiple related code snippets 276, code paths 278, or other data.

Figure 3:
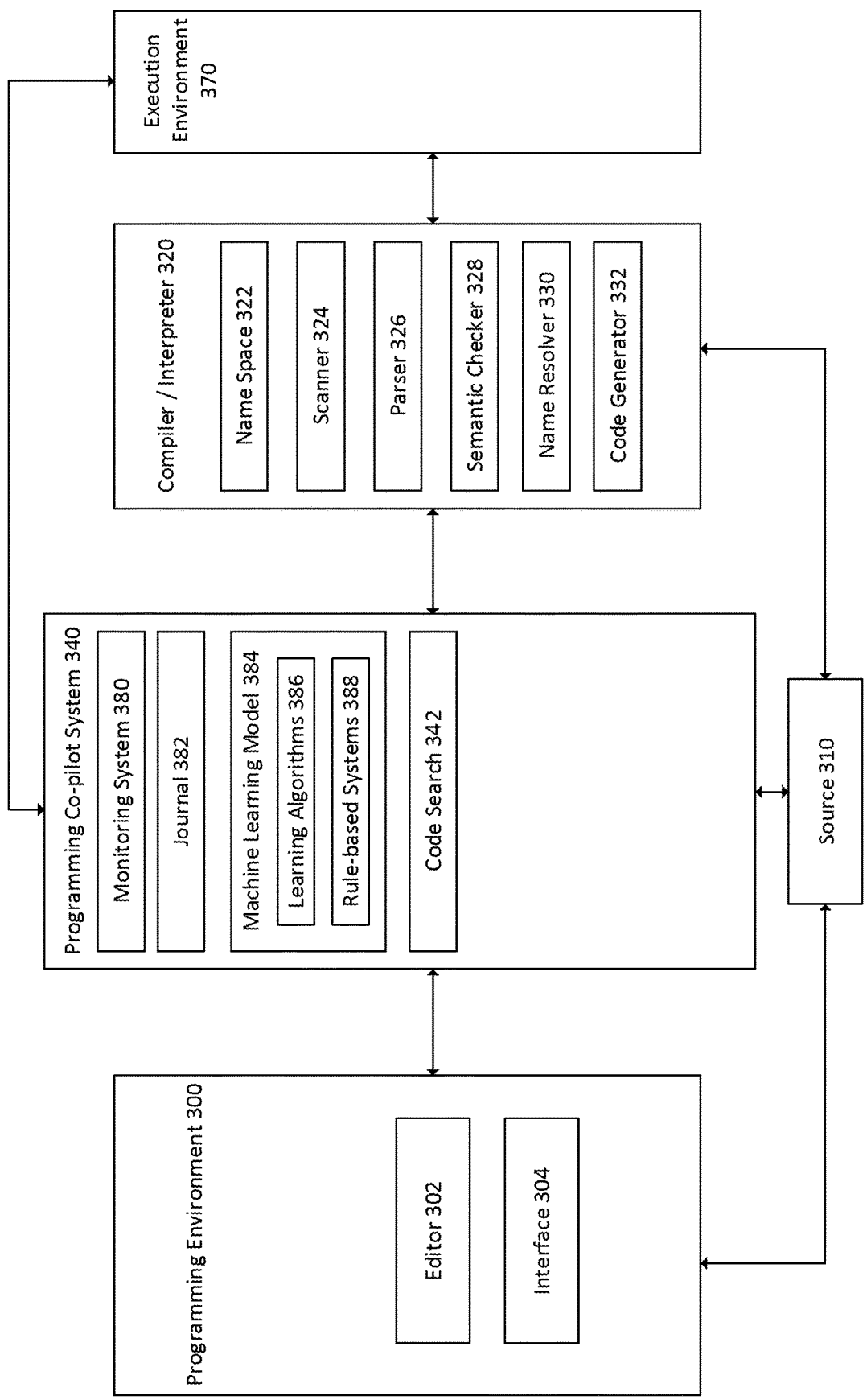
FIG. 3 illustrates an exemplary system for software development.

FIG. 3 illustrates an exemplary system for software development. Source code 310 may be provided and edited in a programming environment 300. The programming environment may allow interactive editing of the source code 310 by a user, such as a programmer. A programming environment may include an editor 302 and an interface 304. The editor 302 may provide for the developing, such as writing and editing, of source code 310. The interface 304 may present a human viewable or usable interface for using the editor 302. For example, the interface 304 may comprise a graphical user interface. Many different kinds of editor 302 may be used such as an integrated development environment (IDE), text editor, or command line. In some embodiments, an IDE such as Eclipse, Sublime, Atom, or Visual Studio may be used. In other embodiments, a shell or operating command line such as the Bash command line is used as a programming environment and may comprise an editor 302. In still other embodiments, single input interactive environments, such as Read-Eval-Print Loop (REPL), may be used as the editor 302.

A compiler or interpreter 320 may compile the code 310 into executable instructions or an intermediate representation or interpret the source code 310 for execution. The compiler/interpreter 320 may comprise a namespace 322 that can be used to store symbols, such as identifiers and types, and to allow for name resolution 330. In some embodiments, the compiler/interpreter interpreter 320 may comprise a scanner 324, parser 326, semantic checker 328, name resolver 330, and code generator 332. Scanner 324 may accept as input the source code 310 and split expressions and language statements into tokens that can be processed by the parser 326 to determine the grammatical structure of a program. A token may be a single element of a programming language such as a constant, identifier, operator, separator, reserved word, or other element. In some embodiments, a token is atomic and is the smallest semantic unit of a programming language, such that the token cannot be broken down further into units with semantic meaning in the language. The parser 326 may parse the tokens and organize them according to a grammar of a programming language. In some embodiments, parser 326 builds a parse tree. Semantic checker 328 may perform semantic checking of a computer program and may identify and throw errors that are semantic in nature. The name resolver 330 may resolve names in the parse tree to elements of the namespace 322. Code generator 332 may translate the parse tree, or other intermediate representation of the source code, into a target language. The target language may be executable instructions, such as a binary executable, or an intermediate language that may be interpreted for execution.

Programming co-pilot system 340 may interact with the programming environment 300, source code 310, compiler/interpreter 320, and execution environment 370 to provide programming assistance to the programmer. Programming co-pilot 340 may include a monitoring system 380 to monitor user actions in an editor 302 and system events such as inputs, outputs, and errors. Programming co-pilot 340 may also include a journal 382, which may comprise a digital record of the history of data, such as sequential changes to and versions of source code, user interactions in the editor 302, user interactions in other parts of a system such as a terminal or web browser, system events, and other data. The journal 382 may record data sequentially so that a sequence of events may be exactly reconstructed. Programming co-pilot 340 may include functionalities such as code search system 342 and other features. Programming co-pilot 340 may include machine learning model 384 to power its functionality, including learning algorithms 386 that learn from data or rule-based systems 388 that use hard-coded rules or heuristics. Although illustrated as one unit, multiple machine learning models 384 may be used in practice to perform or implement different functionality. For example, each function may have a separate machine learning model. Programming co-pilot system 340 may interface with the programming environment 300 through API calls, data streams, inter-process messages, shared data structures, or other methods. In some embodiments, the programming co-pilot 340 is a separate program from the programming environment 300. In other embodiments, the programming co-pilot is a sub-program or component of the programming environment 300.

An embodiment of a programming co-pilot system 340 and its various functionality will be described herein. The programming co-pilot system 340 may include various combinations of the features described herein. In some embodiments, it includes all the functionalities described herein, and, in other embodiments, it includes only a subset of the functionalities described.

Embodiments may operate on any kind of source code including imperative programming languages, declarative code, markup languages, scripting languages. and other code. For example, source code may be Python, Perl, PHP, Javascript, Java, C, C++, HTML, reStructuredText, Markdown, CSS, shell scripts (such as bash, zsh, etc.), and so on.

A. Generating Keywords for Code Entities

Figure 4A:
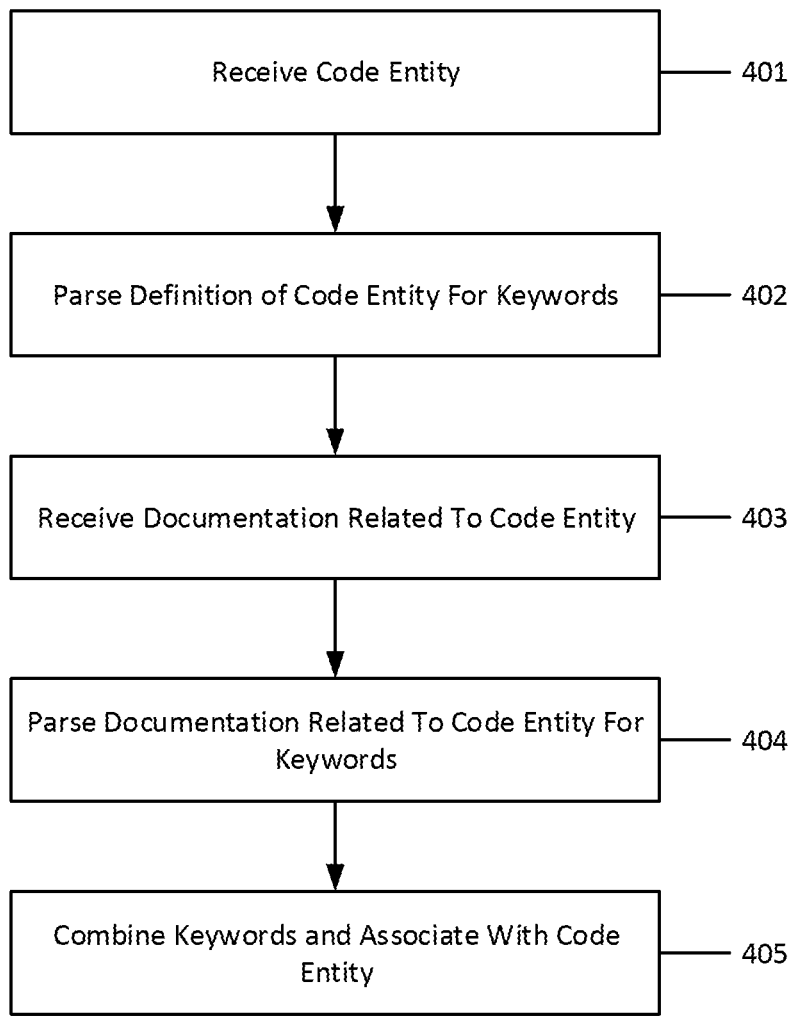
FIG. 4A illustrates the steps of a method for generating keywords for a code entity according to an embodiment.

FIG. 4A illustrates the steps of a method for generating keywords for a code entity according to an embodiment. A code entity may be a reference to any logical division of software source code such as but not limited to a class, a namespace, a function, a module, a method, a routine, a subroutine, a procedure, a library, or other such callable units of software source code. As new code entities are ingested and/or indexed by a programming co-pilot system, keywords associated with the code entities are determined and stored in an index.

At step 401, a new code entity is provided to a programming co-pilot system such as programming co-pilot system 340. Code entities may be provided to or accessed by a programming co-pilot system such as programming co-pilot system 340. For example, a user may input or select a code entity in programming environment 300. Code entities may be received from local or remote resources such as code storage 154, 156 or external code source 110, 111. For example, software source code residing on a local file system may be indexed by a programming co-pilot system. Remote resources such as internet web pages or software repositories may similarly be provided to or accessed by a programming co-pilot system. For example, a programming co-pilot system may index source code retrieved from or provided by a remote source code repository implementing a version control system such as but not limited to concurrent versions system (CVS), subversion (SVN), or GIT.

The fully-qualified name or identifier of the code entity may be selected as a keyword associated with the code entity. In some embodiments, individual tokens or subparts of the fully-qualified name of the code entity may be selected as keywords associated with the code entity.

At step 402, the source definition of the code entity is parsed and at least some tokens or references to other code entities within the code entity under analysis are used to select keywords related to that code entity. For example, the fully-qualified names of the referenced code entities, or portions thereof, may be used as keywords. For example, if a code entity calls another segment of code, the tokens related to that other segment of code may be selected as a keywords for the code entity. In some embodiments, tokens that do not reference other code entities may be selected as keywords associated with the code entity under analysis. For example, variable names, data constants, and data literals within the body of the code entity may be selected as keywords. The fully-qualified names of code entities and identifiers may be broken apart such that each part of a fully-qualified name may be used as a keyword. For example, a call to the function identified by "requests.api.get" may be broken down into keywords "http," "get," and "request."

In some embodiments, keywords extracted from tokens or references to other code entities are selected or filtered by relevancy, uniqueness, rarity, and/or prominence. For example, keywords may be ranked by a count of how many times the keyword appears in the code entity. In some embodiments, keywords may be selected according to a metric related to how important a keyword may be to the code entity. In an embodiment, keywords may be selected according to a term frequency-inverse document frequency (TFIDF) of the keyword relative to the code entity and a corpus of code entities. The TFIDF value of a keyword may increase proportionally to the number of times a keyword appears in the code entity and is offset by the number of code entities in the corpus of code entities that contain the keyword. This approach surfaces keywords which appear in the code entity at a rate higher than other code entities in a corpus of comparable code entities such as code entities written in the same programming language. In some embodiments, a machine learning model such as machine learning model 200 may be trained to select keywords from a list of possible keywords.

In addition to extracting keywords from the source code of the code entity, at step 403 documentation about the code entity may be provided to determine additional keywords associated with the code entity. For example, inline or block comments in the text of the definition of the code entity which are not themselves executable code may be analyzed to determine keywords related to the code entity. As an example, in the Python programming language, a docstring for a module in which a code entity exists may be one such comment or source of documentation. Various methods for analyzing text to determine keywords related to the code entity may be used such as, but not limited to, the methods described with respect to step 406 and elsewhere herein.

External sources of documentation may also be retrieved that are related to the code entity under analysis may also be retrieved. For example, sources of documentation about a codebase or library that the code entity is a part of may be sources of keywords for a code entity. Sources of documentation may include, for example, software library documentation, 'readme' files that accompany a code entity, tutorials about a code entity, application programming interface (API) documentation, or other such software package documentation that may be referenced by an identifier of the code entity. Sources of documentation may be received from local sources or remote sources such as source code repositories or internet resources.

At step 404, keywords are extracted from any identified documentation related to the code entity. Keywords extracted from documentation sources may be filtered or selected according to a metric of relevance, uniqueness, rarity, and/or prominence such as described above.

At step 405, any keywords identified in the steps 402 or 404 above are combined into a single set of keywords associated with the code entity. Keywords extracted by any of the above methods may further be filtered or selected according to a metric of relevance, uniqueness, rarity, and/or prominence such as described above. In some embodiments, the code entity or a reference to the code entity may be stored in a database and keywords associated with the code entity may be further filtered or selected according to a metric of relevance, uniqueness, rarity, and/or prominence such as described above.

Figure 4B:
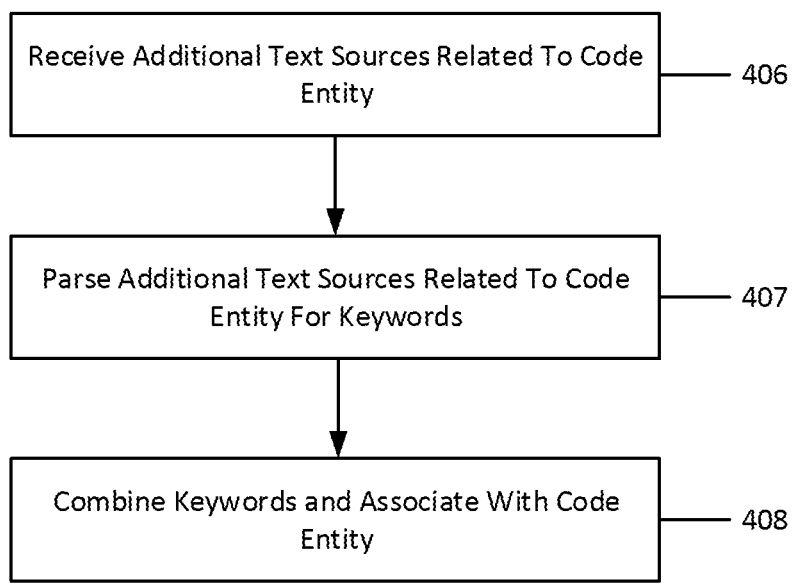
FIG. 4B illustrates additional steps of a method for generating keywords for a code entity according to an embodiment.

FIG. 4B illustrates additional steps of a method for generating keywords for a code entity according to FIG. 4A.

According to FIG. 4B, at step 406, additional sources of keywords may be analyzed such as textual content identified as associated with the code entity that is not necessarily categorized as documentation. For example, discussions on message boards or other textual communications methods mentioning the code entity may be selected as potential sources of additional keywords. Similarly, any metadata related to those discussions or communications may be sources of additional keywords. For example, a posting and related discussion thread on a software source code discussion website may be selected as a potential source for additional keywords. For example, websites for sharing code or expert knowledge such as Stack Overflow or GitHub may be sources of potential keywords. A web scraper may be used to access and download snippets from an online community, app, or website to store the snippets in a code storage 153. If the software source code discussion website includes metadata about the discussion such as tags or topics, those metadata sources may be selected as a potential source for additional keywords as well. As another example, text of a book or written tutorial that references a code entity may similarly be selected as a potential source for additional keywords.

At step 407, keywords are extracted from any identified additional textual content related to the code entity. Keywords may be identified based on statistical metrics, document structure, linguistics, or by a trained neural network.

In some embodiments, keywords are extracted from text using a statistical approach. For example, a word frequency statistic may be used to identify and extract keywords from a text document. All words of a document may be counted and indexed, and a top number or percentage of all unique words in the document may be selected as keywords. Common words such as conjunctions and articles may be omitted from frequency analysis to better isolate words having more semantic meaning. In some embodiments, a fixed dictionary of words may be omitted from analysis, and in other embodiments a machine learning approach may be used to identify common words to be omitted from frequency or statistical analysis.

The structure of a document may contain information that may be used to identify keywords of a text document. For example, if the document is encoded in a markup language such as HTML, markup tags associated with the readable text of the document may be used as hints or indicators of important words that may be identified as keywords. In HTML, for example, a heading tag may be an indicator that the text contained in the heading is representative of a high-level concept that surrounding text is related to. Similarly, bulleted or numbered lists may indicate portions of text that encapsulate the meaning of nearby text.

In some embodiments, keywords may be extracted from text based on the linguistic properties of words and sentences in the text. For example, words in a text may be identified by their grammatical properties and then certain classes of words may be selected as keywords or for further keyword analysis. In an embodiment, words in a text are tagged by a parts of speech tagger. Words that are tagged as the same part of speech have similar syntactical behavior within the grammatical structure of sentences. For example, common English parts of speech include nouns, verbs, adjectives, adverbs, pronouns, prepositions, conjunctions, interjections, among others. Words may further be tagged, grouped, or classified based on their relationship with adjacent and related words in a phrase, sentence, or paragraph. For example, portions of sentences may be tagged with identifiers such as subject, object, adverbial, or verb, among others. Keywords may then be identified from a text using this grammatical and linguistic information. For example, proper nouns may be selected as candidates for keyword extraction as they may identify specific topics or concepts that are closely related to the semantic meaning embodied by the text.

In some embodiments, any of the above approaches or methods may be implemented as a set of rules or heuristics applied to the associated text sources. These rules or heuristics may be represented in a decision tree format, for example. In addition, implementations of these approaches may be combined together. For example, a rules-based approach may use linguistic features to identify keyword candidates, and then use a statistical approach to select a subset of the keyword candidates as final keywords for a document.

In some embodiments, a machine learning model may be trained to determine keywords of a document. For example, a neural network may be trained to identify and extract keywords from documents. A machine learning model may also be combined with a rules-based keyword extraction approach as well. For example, a set of rules-based keyword extraction methods may be used to pre-process the text of a document before it is analyzed by a machine learning model.

At step 408, any keywords identified in the steps 402, 404, or 407 above are combined into a single set of keywords associated with the code entity. Keywords extracted by any of the above methods may further be filtered or selected according to a metric of relevance, uniqueness, rarity, and/or prominence such as described above. In some embodiments, the code entity or a reference to the code entity may be stored in a database and keywords associated with the code entity may be further filtered or selected according to a metric of relevance, uniqueness, rarity, and/or prominence such as described above.

B. Generating Keywords for Code Snippers

Some embodiments may facilitate searching for code snippets. For example, a code snippet may be two or more code entities that are related, such as a line of code, multiple contiguous lines of code, multiple non-contiguous lines of code, or combinations thereof. Multiple non-contiguous lines of code may be comprised of several portions of contiguous lines of code, such as a segment of lines of code from a first source which is associated with a second segment of lines of code from a second source.

Code snippets may be identified by a programming co-pilot system such as programming co-pilot system 340.

Code snippets may be identified in local or remote resources such as code storage 154, 156. For example, software source code residing on a local file system may be indexed by a programming co-pilot system. Remote resources such as internet web pages or software repositories may similarly be provided to or accessed by a programming co-pilot system. For example, a programming co-pilot system may index source code retrieved from or provided by a remote source code repository implementing a version control system such as but not limited to Concurrent Versions System (CVS), Subversion (SVN), or Git.

One example of identifying code snippets includes analyzing check-in behavior of a source control repository such as Git or SVN. Code that is frequently altered in the same check-in may be identified as a code snippet. For example, if analysis of a source code repository reveals that a group of code entities from a first file are often changed together in check-ins, that grouping of code entities may be identified as a code snippet.

A code snippet may be identified in a source control repository by a machine learning model such as machine learning model 200 using a learning algorithm or a rule-based system.

Code snippets may also be identified by monitoring user behavior and associating code that is edited jointly. For example, changes to files may be observed and code snippets identified and associations created between portions of files determined in a similar way as the check-in analysis described above. Rather than monitoring discrete, user-initiated check-ins to a code repository, however, related code snippets may be identified through identifying edits that are close in time or frequently associated with each other. A code snippet may be identified by monitoring user behavior by using a machine learning model 200 using a learning algorithm or a rule-based system.

Another example of identifying code snippets includes identifying code portions reproduced together in documentation or other textual sources. For example, if a posting on an internet discussion forum includes a reproduction of a series of source code, that grouping of source code may represent a code snippet. In some embodiments, websites for sharing code or expert knowledge such as Stack Overflow or GitHub may be sources of potential code snippets. A web scraper may be used to access and download snippets from an online community, app, or website. As another example, source code reproduced in the text of a book or written tutorial may be identified as a code snippet. A code snippet may be identified in any of these text sources with a machine learning model 200 using a learning algorithm or a rule-based system.

Code snippets may also be identified through static analysis of source code. For example, a portion of source code may be analyzed according to a set of rules to identify snippets of code therein that may be related in some way which comprise a code snippet. Some examples of heuristics may include evaluating the grammar of the source code such as indentation, commenting, bracketing, bracing, or other such source code grammar. In some embodiments, a compiler or interpreter such as compiler or interpreter 320 may be used to execute or run source code to facilitate code snippet identification. For example, the lines that form the body of a loop may be grouped together as a code snippet. Variable usage and naming may be used in identifying code snippets. For example, lines of code that reference the same variable or variables within the same context may be identified as a code snippet. Code snippets may be identified in source code by using a machine learning model 200 using a learning algorithm or a rule-based system.

Figure 5:
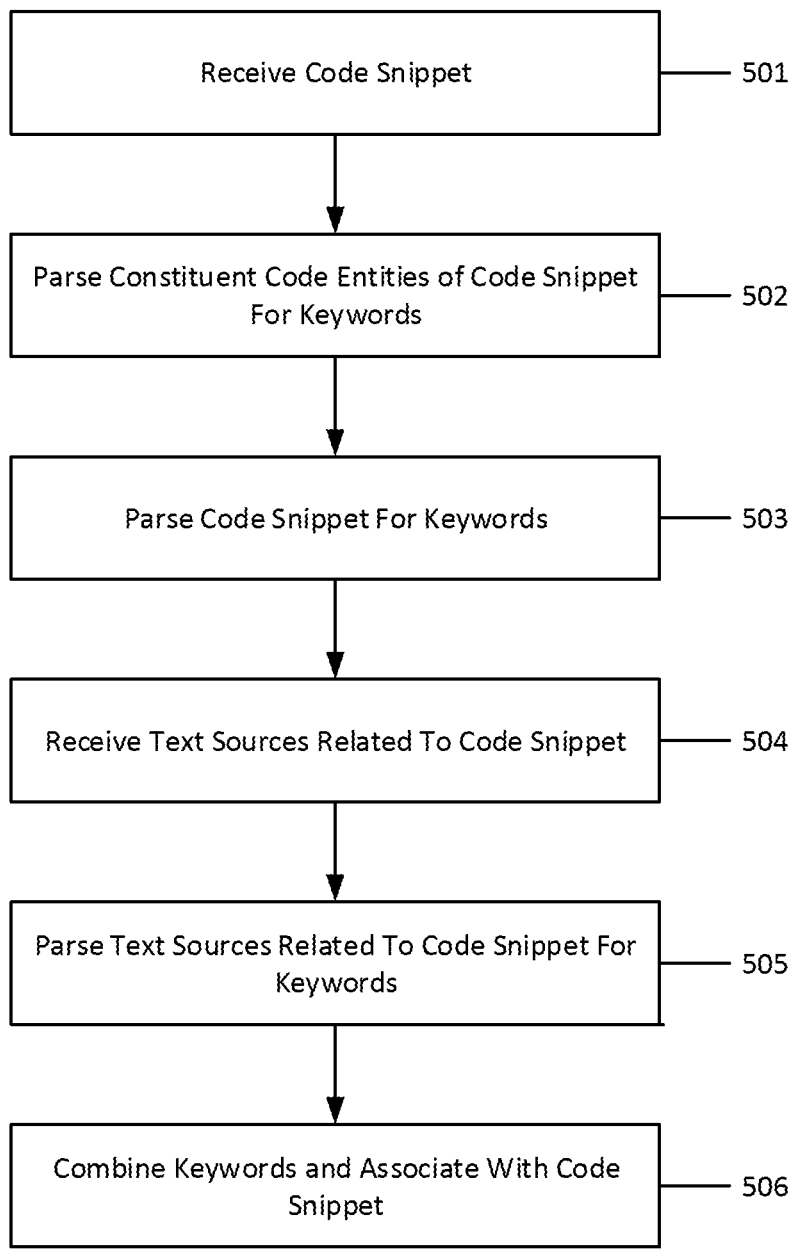
FIG. 5 illustrates the steps of a method for determining keywords for a code snippet according to an embodiment.

FIG. 5 illustrates the steps of a method for determining keywords for a code snippet according to an embodiment. At step 501, a new code snippet is provided to a programming co-pilot system such as through any of the methods or approaches described above.

At step 502, the code snippet is parsed into its constituent code entities, and any keywords associated with any of those constituent code entities as determined through a process such as described above in connection with FIG. 4 may be collected as potential keywords associated with the code snippet.

At step 503, the code snippet is parsed and at least some tokens or references to other code entities within the code snippet under analysis are selected as keywords related to that code snippet. For example, variable names, data constants, and data literals within the body of the code snippet may be selected as keywords. In addition, comments or other non-parsed text within the body of the code snippet may be sources of keywords. As an example, in the Python programming language, a docstring may be one such comment or source of documentation.

At step 504, text sources referencing the code snippet may be provided to determine additional keywords associated with the code snippet. Sources of text associated with a code snippet may include documentation or other text sources such as discussions on message boards or other internet sources referencing the code snippet. For example, discussions on message boards or other textual communications methods mentioning the code snippet may be selected as potential sources of additional keywords. For example, websites for sharing code or expert knowledge such as Stack Overflow or GitHub may be sources of potential keywords. A web scraper may be used to access and download snippets from an online community, app, or website. As another example, text of a book or written tutorial that reproduces a code snippet may similarly be selected as a potential source for additional keywords. Similarly, any metadata related to those discussions or communications may be sources of additional keywords. For example, a posting and related discussion thread on a software source code discussion website may be selected as a potential source for additional keywords. If the software source code discussion website includes metadata about the discussion such as tags or topics, those metadata sources may be selected as a potential source for additional keywords as well. As another example, text of a book or written tutorial that references a code snippet may similarly be selected as a potential source for additional keywords.

At step 505, keywords are extracted from any identified text sources related to the code snippet. Keywords extracted from text sources may be selected or filtered by relevancy, uniqueness, rarity, and/or prominence such as described above in reference to filtering or selecting keywords for code entities. For example, keywords may be ranked by a count of how many times the keyword appears in the code snippet. In some embodiments, keywords may be selected according to a metric related to how important a keyword may be to the code snippet. In an embodiment, keywords may be selected accord to a term frequency-inverse document frequency (TFIDF) of the keyword relative to the code snippet and a corpus of code snippets. The TFIDF value of a keyword may increase proportionally to the number of times a keyword appears in the code snippet and is offset by the number of code snippets in the corpus of code snippets that contain the keyword. This approach surfaces keywords which appear in the code snippet at a rate higher than other code snippets in a corpus of comparable code snippets such as code snippets written in the same programming language. In some embodiments, a machine learning model such as machine learning model 200 may be trained to select keywords from a list of possible keywords.

At step 506, any keywords identified in steps above are combined into a single set of keywords associated with the code snippet. The single set of keywords associated with the code snippet may be further filtered or selected according to a metric of relevance, uniqueness, rarity, and/or prominence such as described above.

C. Joint Embeddings for Code Entities

Some embodiments may use a machine learning model for code entities related to a search query. Instead of searching for code entities based on keywords, these embodiments jointly embed code entities and associated natural language text into a tensor space. In some embodiments, the tensor space is high-dimensional, such as 10 dimensions, 20 dimensions, 50 dimensions, 100 dimensions, 200 dimensions, 500 dimensions, 1,000 dimensions, or more. Code entities and associated text are encoded to have similar tensor values in this high-dimensional tensor space, such that similarities in the high-dimensional tensor space may be used to find code entities based on new textual inputs such as search terms or search phrases. With the unified tensor representation, code entities semantically related to natural language text can be retrieved. Semantically related words can also be recognized and irrelevant/noisy keywords in queries can be handled. In some embodiments, a machine learning model such as machine learning model 200 may be used to generate the tensors.

Figure 6A:
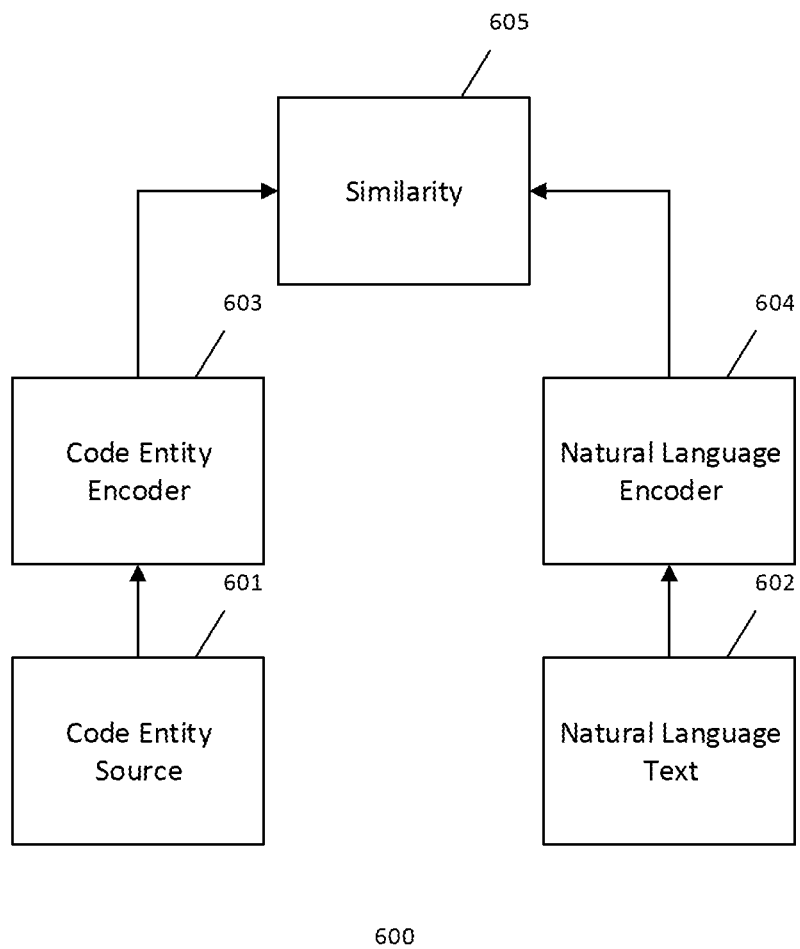
FIG. 6A illustrates a machine learning network for code entity search according to an embodiment.

FIG. 6A illustrates a machine learning network 600 for code entity search according to an embodiment. Code entity encoder 603 generates a tensor embedding in a joint tensor space for an input code entity source 601. Natural language encoder 604 generates a tensor embedding in the same joint tensor space for input natural language text 602. The output of the code entity neural network encoder and the output of the natural language neural network encoder are tensors within a shared, high-dimension tensor space. In some embodiments, the code entity neural network encoder and the natural language neural network encoder are comprised of a plurality of neural network layers, such as recurrent neural network layers and/or convolutional neural network layers and/or other layers. In some embodiments, the code entity neural network encoder and the natural language neural network encoder may each be a machine learning network such as machine learning network 200. Similarity measure 605 determines a similarity or distance between embeddings in the joint embedding space. In an embodiment, the distance between embeddings in the joint embedding space may be a cosine similarity determined by similarity measure 605.

Figure 6B:
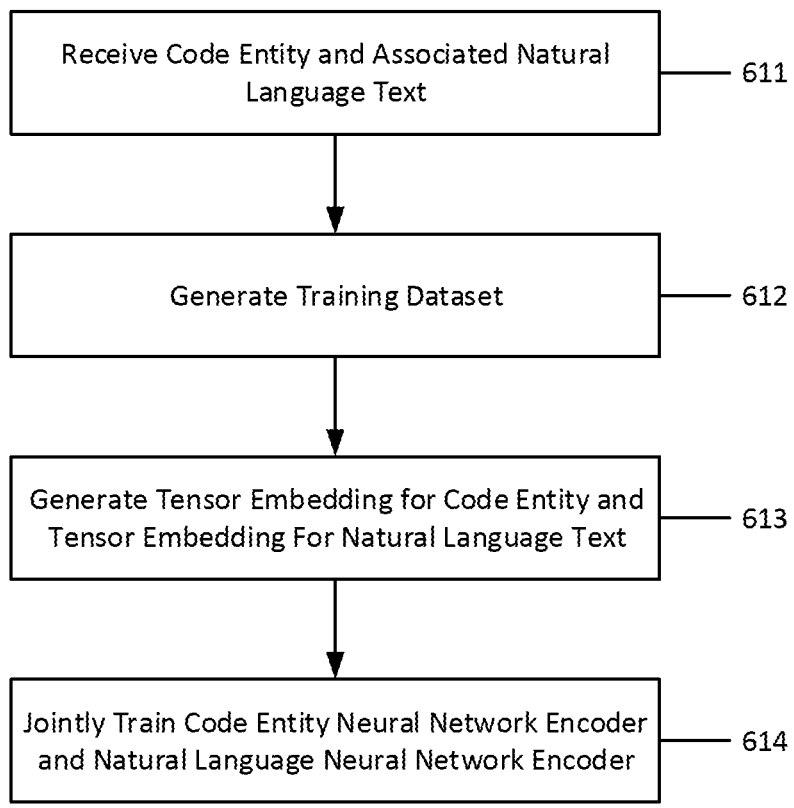
FIG. 6B illustrates the steps of a method for training a neural network for code entity search according to an embodiment.

FIG. 6B illustrates the steps of a method for training a machine learning network such as neural network 600 for code entity search. At step 611, code entities and associated natural language text are identified and received. Code entities may be any kind of code entity as described above in connection with FIG. 4, for example. Associated text may be any kind of text associated with a code entity such as documentation sources or other related text such as described above in connection with FIG. 4, for example. An example of a code entity and associated natural language text is a function and a segment of documentation associated with the function.

These textual sources are pre-processed at step 612 to produce a training dataset. In some embodiments, textual sources are segmented into individual words, sentences, phrases, paragraphs, or other document chunks sub-segment for training. Each segment or sub-segment of a document determined to be related to a code entity is provided as a training data to train a code entity neural network encoder. The training dataset may be further filtered or processed to select the most relevant text to associate with a code entity. For example, common words or phrases may be omitted from the training dataset. In addition, source code of a definition of a code entity may be pre-processed or filtered for training machine learning models. For example, comments or non-code text may be omitted for training purposes, or variable names may be standardized or modified for training purposes.

At step 613, a code entity is provided to the code entity neural network encoder and training data associated with the code entity is provided to a natural language neural network encoder. The output of each encoder is a tensor embedding in a joint tensor space. That is, the output of the code entity neural network encoder and the output of the natural language neural network encoder are tensors within a shared, high-dimension tensor space. In some embodiments, the code entity neural network encoder and the natural language neural network encoder are comprised of a plurality of recurrent neural network layers and/or convolutional neural network layers.

At step 614, the code entity neural network encoder and the output of the natural language neural network encoder are jointly trained on the supplied training dataset comprising the code entity and associated natural language textual data. A first tensor embedding of a code entity from the code entity neural network encoder is compared against a second tensor embedding from the natural language neural network encoder for a segment of natural language text that is associated with the code entity. Backpropagation is used to adjust the parameters of the code entity neural network encoder and the natural language neural network encoder so that the two embeddings are more similar or closer in the joint embedding space.

In some embodiments, negative examples of natural language text that is not associated with a code entity may also be used to train the two neural networks. Positive examples comprise examples of natural language text that is associated with a code entity. The neural network encoders may be trained to both maximize the similarities of embeddings of positive examples and minimize the similarities of negative examples. The internal parameters of the two neural network encoders are adjusted by backpropagation to make the tensors closer in tensor space, for positive examples, and farther in tensor space, for negative examples.

D. Joints Embeddings for Code Snippets

Some embodiments may use a machine learning model for code snippets related to a search query. Instead of searching for code snippets based on keywords, these embodiments jointly embed code snippets and associated natural language text into a high-dimensional tensor space. Code snippets and associated text are encoded to have similar tensor values in this high-dimensional tensor space, such that similarities in the high-dimensional tensor space may be used to find code snippets based on new textual inputs such as search terms or search phrases. With the unified tensor representation, code snippets semantically related to natural language text can be retrieved. Semantically related words can also be recognized and irrelevant/noisy keywords in queries can be handled. In some embodiments, a machine learning model such as machine learning model 200 may be used to generate the tensors.

Figure 7A:
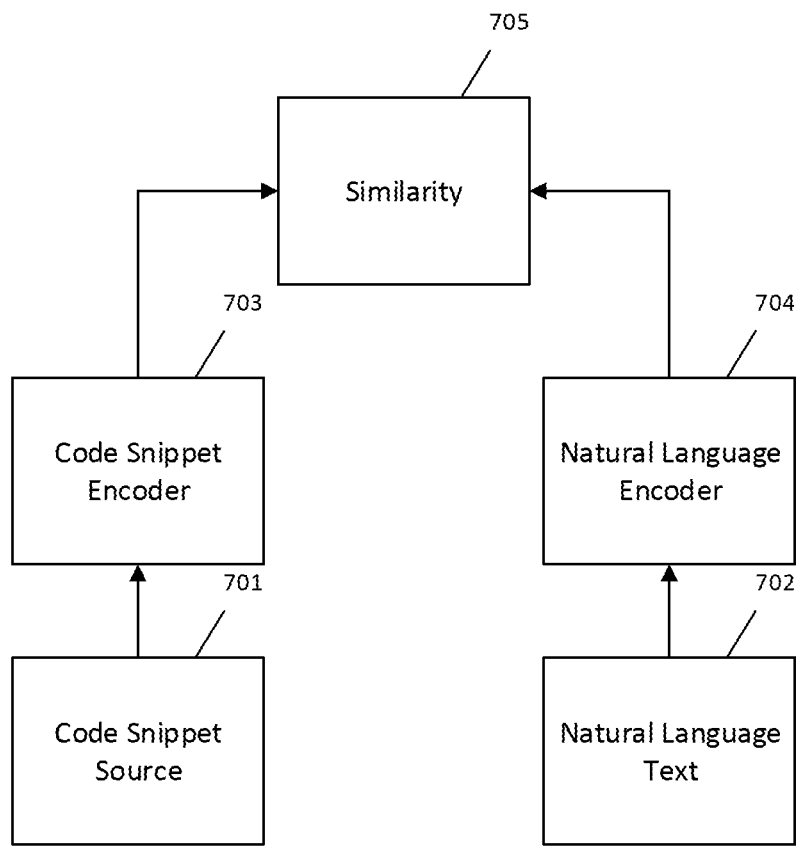
FIG. 7A illustrates a machine learning network for code snippet search according to an embodiment.

FIG. 7A illustrates a machine learning network 700 for code snippet search according to an embodiment. Code snippet encoder 703 generates a tensor embedding in a joint tensor space for an input code snippet source 701. Natural language encoder 704 generates a tensor embedding in the same joint tensor space for input natural language text 702. The output of the code snippet neural network encoder and the output of the natural language neural network encoder are tensors within a shared, high-dimension tensor space. In some embodiments, the code snippet neural network encoder and the natural language neural network encoder are comprised of a plurality of neural network layers, such as recurrent neural network layers and/or convolutional neural network layers and/or other layers. In some embodiments, the code snippet neural network encoder and the natural language neural network encoder may each be a machine learning network such as machine learning network 200. Similarity measure 705 determines a similarity or distance between embeddings in the joint embedding space. In an embodiment, the distance between embeddings in the joint embedding space may be a cosine similarity determined by similarity measure 705.

Figure 7B:
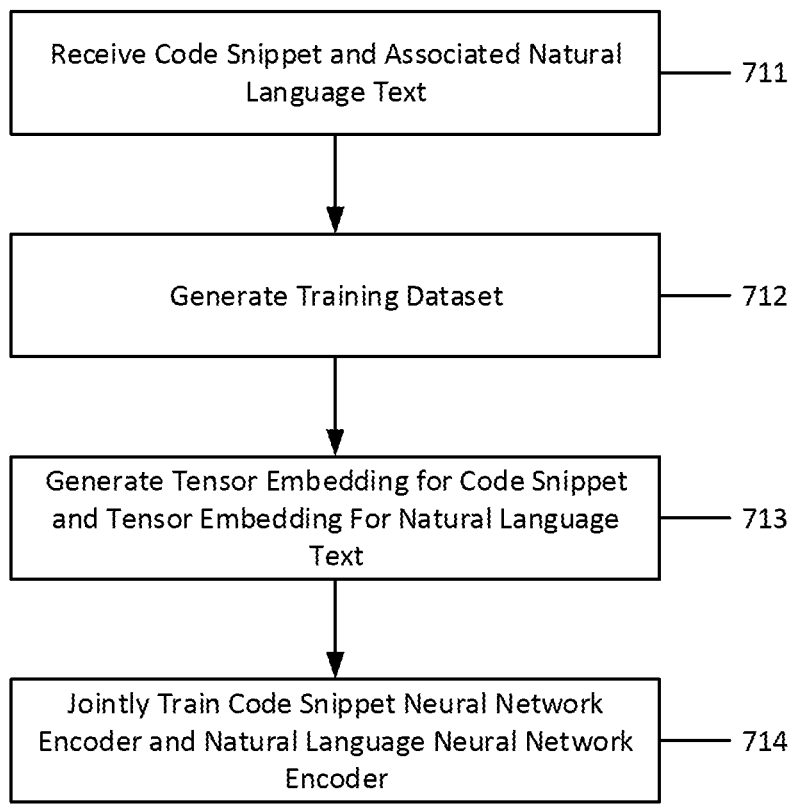
FIG. 7B illustrates the steps of a method for training a neural network for code snippet search according to an embodiment.

FIG. 7B illustrates the steps of a method for training a machine learning network such as neural network 700 for code snippet search. At step 711, code snippets and associated natural language text are identified and received. Code snippets may be any kind of code snippet as described above in connection with FIG. 4, for example. Associated text may be any kind of text associated with a code snippet such as documentation sources or other related text such as described above in connection with FIG. 4, for example. An example of a code snippet and associated natural language text is a function and a segment of documentation associated with the function.

These textual sources are pre-processed at step 712 to produce a training dataset. In some embodiments, textual sources are segmented into individual words, sentences, phrases, paragraphs, or other document chunks sub-segment for training. Each segment or sub-segment of a document determined to be related to a code snippet is provided as a training data to train a code snippet neural network encoder. The training dataset may be further filtered or processed to select the most relevant text to associated with a code snippet. For example, common words or phrases may be omitted from the training dataset. In addition, source code of a definition of a code snippet may be pre-processed or filtered for training machine learning models. For example, comments or non-code text may be omitted for training purposes, or variable names may be standardized or modified for training purposes.

At step 713, a code snippet is provided to the code snippet neural network encoder and training data associated with the code snippet is provided to a natural language neural network encoder. The output of each encoder is a tensor embedding in a joint tensor space. That is, the output of the code snippet neural network encoder and the output of the natural language neural network encoder are tensors within a shared, high-dimension tensor space. In some embodiments, the code snippet neural network encoder and the natural language neural network encoder are comprised of a plurality of neural network layers, such as recurrent neural network layers and/or convolutional neural network layers and/or other layers.

At step 714, the code snippet neural network encoder and the output of the natural language neural network encoder are jointly trained on the supplied training dataset comprising the code snippet and associated natural language textual data. A first tensor embedding of a code snippet from the code snippet neural network encoder is compared against a second tensor embedding from the natural language neural network encoder for a segment of natural language text that is associated with the code snippet. Backpropagation is used to adjust the parameters of the code snippet neural network encoder and the natural language neural network encoder so that the two embeddings are more similar or closer in the joint embedding space.

In some embodiments, negative examples of natural language text that is not associated with a code snippet may also be used to train the two neural networks. Positive examples comprise examples of natural language text that is associated with a code snippet. The neural network encoders may be trained to both maximize the similarities of positive examples and minimize the similarities of negative examples. The internal parameters of the two neural network encoders are adjusted by backpropagation to make the tensors closer in tensor space, for positive examples, and farther in tensor space, for negative examples.

E. Searching for Code Entity

Figure 8:
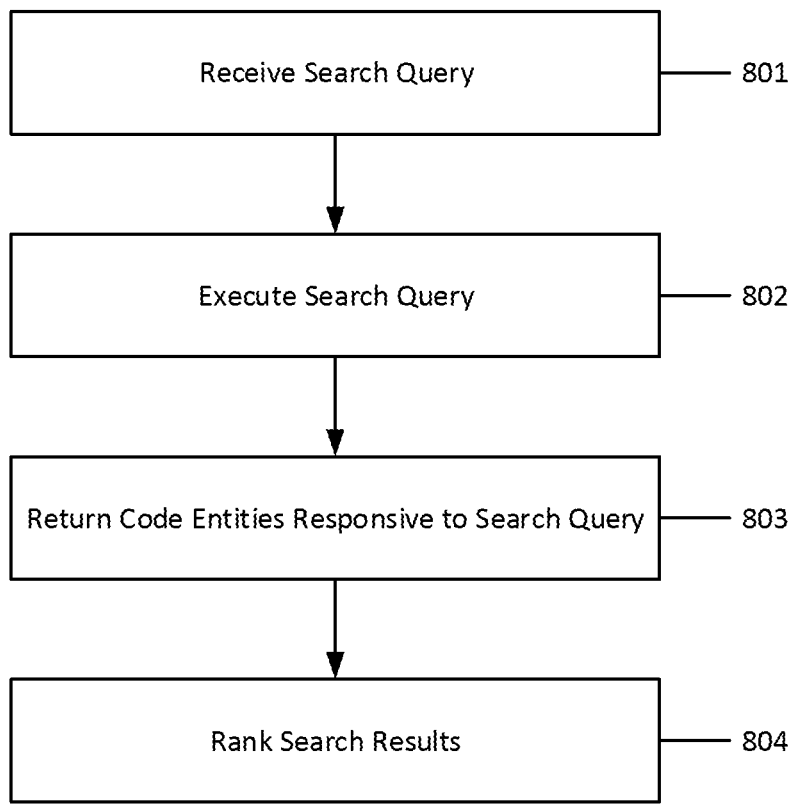
FIG. 8 illustrates the steps of a method for searching for code entities based on keywords according to an embodiment.

FIG. 8 illustrates the steps of a method for searching for code entities based on keywords according to an embodiment. A database or corpus of code entities is first indexed according to one or more indexing methods as described above. A user may then execute search queries against the database to search for code entities according to a search query.

At step 801, a keyword search query is received. In an embodiment, a user may enter a search query in a programming environment such as programming environment 300. A keyword search query may include a single keyword, an unordered plurality of keywords, an ordered plurality of keywords, a plurality of keywords related by Boolean search term operators, a segment of natural language text, or any combination thereof. In some embodiments, a search query may be filtered or pre-processed prior to executing a search. For example, in some embodiments, a query expansion routine may be used to find root stems of search terms and include related search terms in the search query.

At step 802, the search query is executed against the database of indexed code entities. The database may be pre-processed to facilitate searching, and any indices may be generated to facilitate searching of the database. Any search engine or search methodology may be used to search the database for results pertaining to the search query. For example, a search engine may find all results that have a common keyword associated with them that is present in the search query. In some embodiments, the keywords do not need to be exact match and may be matched based on synonyms, semantic relationships, or other fuzzy matching.

At step 803, the search engine returns any matching code entities that are responsive to the search query. A code entity is responsive if one or more keywords associated with the code entity is matched by the search engine to the search query. At step 804, the search results including any matching code entities that are responsive to the search query are ranked according to one or more ranking methods such as described herein. Search results may then be displayed in a programming environment such as programming environment 300, for example.

Figure 9:
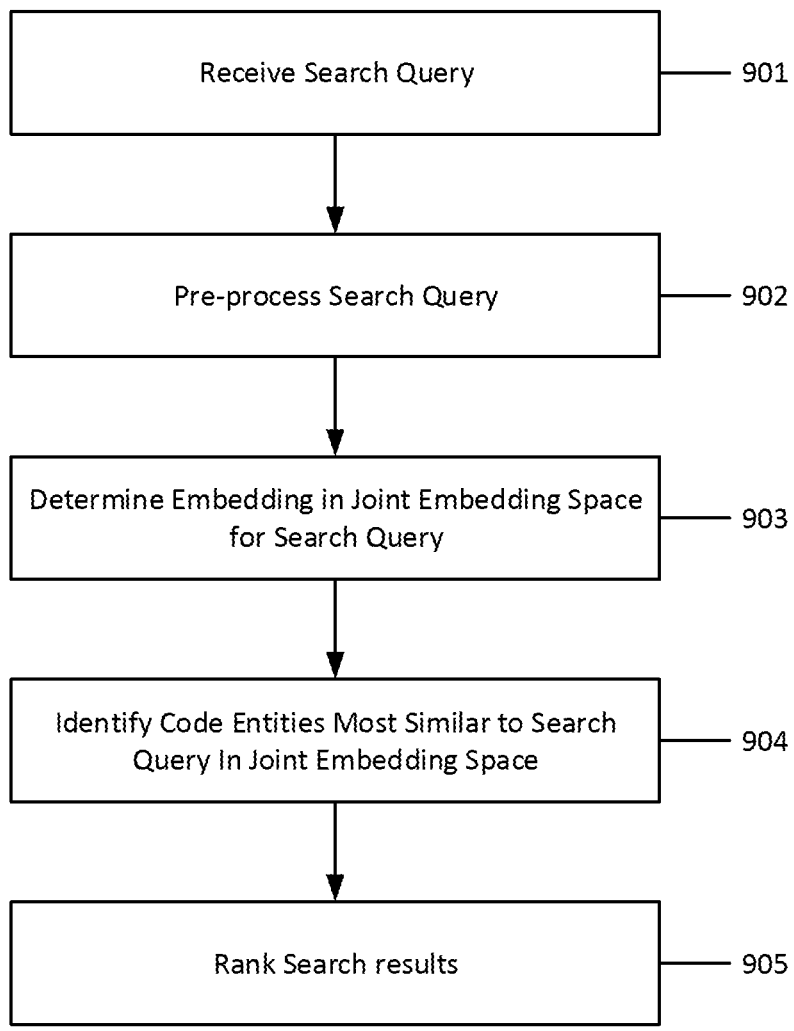
FIG. 9 illustrates the steps of a method for searching for code entities based on embeddings according to an embodiment.

FIG. 9 illustrates the steps of a method for searching for code entities based on joint embeddings according to an embodiment. A database or corpus of code entities snippets is first processed to determine an embedding of each code entity in a joint tensor space as described above. A user may then execute search queries against the database to search for code entities according to a search query.

At step 901, a search query is received that may include keywords, natural language queries, or a combination of keywords and natural language queries. In some embodiments, the search query may be pre-processed at step 902 to put the search query into a standard form. For example, punctuation present in the search query may be removed or a search query may be put into a standard capitalization format.

At step 903, the search query is input into a trained natural language neural network encoder and an embedding of the search query is received from the natural language neural network encoder. The natural language neural network encoder may be trained according to a method such as described in connection with FIG. 6, for example.

Next, at step 904, the database of code entities and their embeddings is evaluated to identify a set of embeddings of code entities that are close to the embedding of the search query in the tensor space. For example, code entity embeddings that are within a threshold distance of the search query embedding may be selected as responsive to the search query. The distance between embeddings in the joint embedding space may be determined by a similarity measure such as a cosine similarity. At step 905, the search results are ranked according to their distance from the search query embedding and returned for display and usage.

F. Searching for Usages of Code Entities

Whether a search is performed by keyword search or embedding search, the search results may be returned to a user as a set of code entities. In some embodiments, the search results may further include the definitions of the code entities of the search results or links to the definitions of the code entities of the search results. In some embodiments, the search results may further include usages of the code entities or links to usages of the code entities. For example, in addition to returning a code entity as a responsive search result, a collections of various usages of that code entity including a snippet of context may also be returned as a part of the search results. For example, usages may include calls to a function, use as a parameter, use in an expression or statement, use in an assignment, or other uses.

In some embodiments, usages of code entities may be identified in locally available sources such as a filesystem or local code repository of a user. In some embodiments, usages of code entities may be identified in external code storage locations such as privately accessible code repositories, publicly accessible code repositories, internet resources, and other such code storage locations such as code storage locations 110, 111, 154, or 156.

In cases where more than one usage of a code entity is identified, usages of the code entity may be ranked according to various factors. One ranking factor may be a measure of a relevance or closeness of the source of the usage to the definition of the code entity. For example, usages within the same file may be ranked highest, usages in the same module may be ranked second highest, usages within the same codebase but in a different module may be ranked next, and usages from other codebases ranked the lowest. Additional ranking and sorting factors may be applied such as those described below.

G. Searching for Code Snippets

Figure 10:
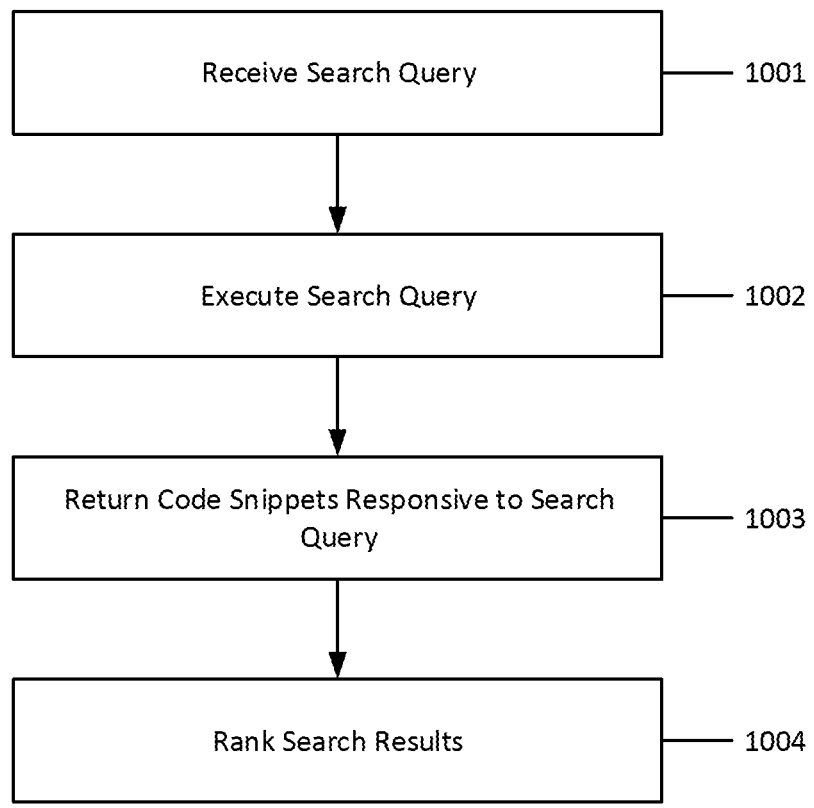
FIG. 10 illustrates the steps of a method for searching for code snippets based on keywords according to an embodiment.

FIG. 10 illustrates the steps of a method for searching for code snippets based on keywords according to an embodiment. A database or corpus of code snippets is first indexed according to one or more indexing methods as described above. A user may then execute search queries against the database to search for code snippets according to a search query.

At step 1001, a keyword search query is received. A keyword search query may include a single keyword, an unordered plurality of keywords, an ordered plurality of keywords, a plurality of keywords related by Boolean search term operators, a segment of natural language text, or a combination thereof. In some embodiments, a search query may be filtered or pre-processed prior to executing a search. For example, in some embodiments, a query expansion routine may be used to find root stems of search terms and include related search terms in the search query.

At step 1002, the search query is executed against the database of indexed code snippets. The database may be pre-processed to facilitate searching, and any indices may be generated to facilitate searching of the database. Any search engine or search methodology may be used to search the database for results pertaining to the search query. For example, a search engine may find all results that have a common keyword associated with them that is present in the search query. In some embodiments, the keywords do not need to match and may be matched based on synonyms, semantic relationships, or other fuzzy matching.

At step 1003, the search engine returns any matching code snippets that are responsive to the search query. At step 1004, the search results including any matching code snippets that are responsive to the search query are ranked according to one or more ranking methods such as described herein.

Figure 11:
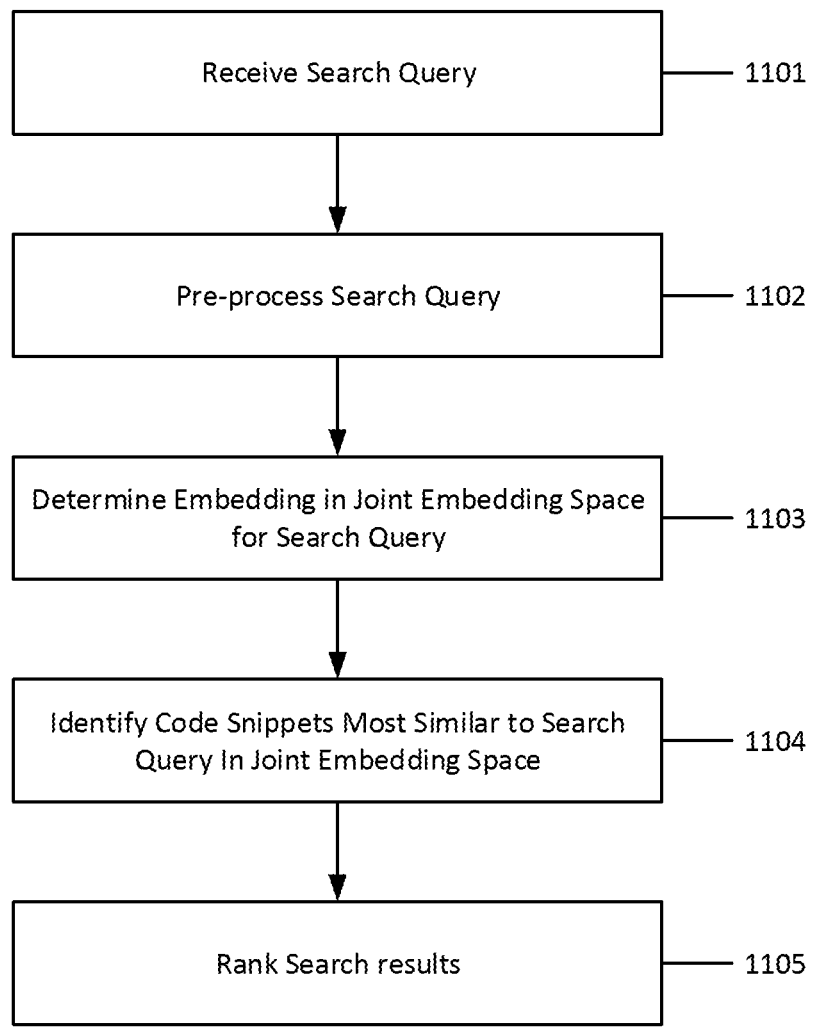
FIG. 11 illustrates the steps of a method for searching for code snippets based on embeddings according to an embodiment.

FIG. 11 illustrates the steps of a method for searching for code snippets based on embeddings according to an embodiment. A database or corpus of code snippets is first processed to determine an embedding of each code snippet in a joint tensor space as described above. A user may then execute search queries against the database to search for code snippets according to a search query.

At step 1101, a search query is received that may include keywords, natural language queries, or both. In some embodiments, the search query may be pre-processed at step 1102 to put the search query into a standard form. For example, punctuation present in the search query may be removed or a search query may be put into a standard capitalization format.

At step 1103, the search query is input into a natural language neural network encoder and an embedding of the search query is received from the natural language neural network encoder. Next, at step 1104, the database of code snippets and their embeddings is evaluated to identify a set of embeddings of code snippets that are close to the embedding of the search query in the tensor space. For example, code snippet embeddings that are within a threshold distance of the search query embedding may be selected as responsive to the search query. The distance between embeddings in the joint embedding space may be determined by a similarity measure such as cosine similarity. At step 1105, the search results are ranked according to their distance from the search query embedding and returned for display and usage.

H. Searching for Multiple Code Snippets

Figure 12:
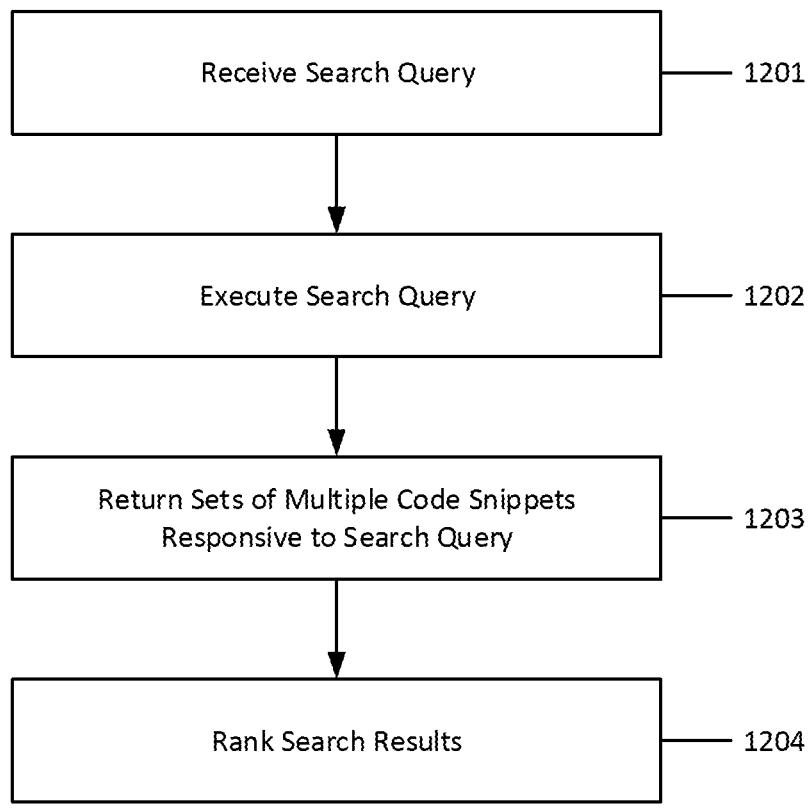
FIG. 12 illustrates the steps of a method for searching for multiple code snippets based on keywords according to an embodiment.

FIG. 12 illustrates the steps of a method for searching for multiple code snippets based on keywords according to an embodiment. A database or corpus of code snippets is first indexed according to one or more indexing methods as described above. Code snippets may be grouped together when they are related to each other, such as for performing the same task. For example, the task of adding a new column to a database table may require the programmer to modify multiple non-contiguous sections of code, such as updating the model, generating a migration file, and running the migration file on the command line. In some embodiments, these code snippets may be in separate files or separate programs. Code snippets may be tagged with keywords to identify the higher level task that it is a part of Multiple code snippets may then be returned when a match on a keyword is found that matches each of the multiple code snippets. A user may then execute search queries against the database to search for multiple code snippets according to a search query.

At step 1201, a keyword search query is received. A keyword search query may include a single keyword, an unordered plurality of keywords, an ordered plurality of keywords, a plurality of keywords related by Boolean search term operators, a segment of natural language text, or a combination thereof. In some embodiments, a search query may be filtered or pre-processed prior to executing a search. For example, in some embodiments, a query expansion routine may be used to find root stems of search terms and include related search terms in the search query.

At step 1202, the search query is executed against the database of indexed code snippets. Code snippets may contain references or links to other code snippets, or matching keywords, to indicate a relationship between the code snippets. The database may be pre-processed to facilitate searching, and any indices may be generated to facilitate searching of the database. Any search engine or search methodology may be used to search the database for results pertaining to the search query. For example, a search engine may find all results that have a common keyword associated with them that is present in the search query. In some embodiments, the keywords do not need to match and may be matched based on synonyms, semantic relationships, or other fuzzy matching.

At step 1203, the search engine returns sets of multiple code snippets that are responsive to the search query. In other words, multiple results are returned and each result comprises multiple code snippets, where the code snippets may be non-contiguous and may be in different files. At step 1204, the search results including any matching sets of multiple code snippets that are responsive to the search query are ranked according to one or more ranking methods such as described herein.

Figure 13:
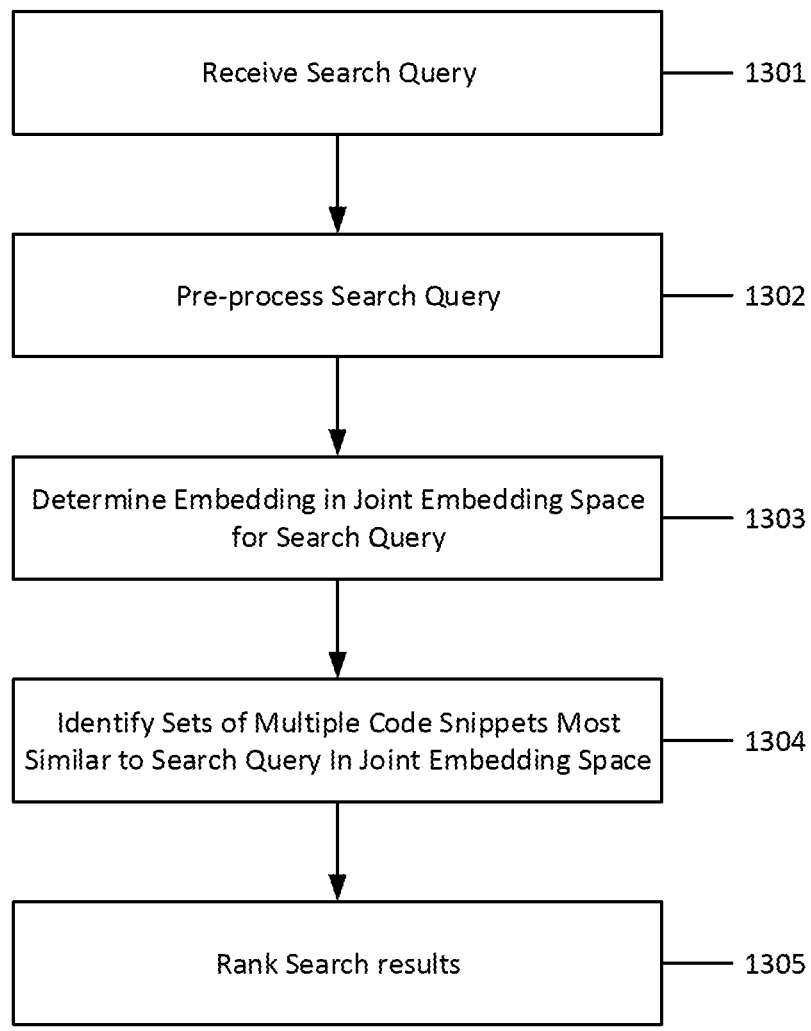
FIG. 13 illustrates the steps of a method for searching for multiple code snippets based on embeddings according to an embodiment.

FIG. 13 illustrates the steps of a method for searching for multiple code snippets based on embeddings according to an embodiment. A database or corpus of code snippets is first processed to determine an embedding of each code snippet in a joint tensor space as described above. Code snippets may be grouped together when they are related to each other, such as for performing the same task. For example, the task of adding a new column to a database table may require the programmer to modify multiple non-contiguous sections of code, such as updating the model, generating a migration file, and running the migration file on the command line. In some embodiments, these code snippets may be in separate files or separate programs.

Code snippets may be tagged with an embedding vector to identify the higher level task that it is a part of. In some embodiments, an embedding vector may be created based on words in documentation or other textual sources associated with the multiple code snippets. For example, keywords extracted from these sources may be used to generate an embedding representing the higher level task that the code snippets are related to. A word embedding may be determined for each keyword, and a centroid or average of a cluster of all keyword embeddings used as the embedding representing the task. In some embodiments, an embedding may be determined for a group of code snippets based on the code of the code snippets. For example, an embedding may be determined for each code snippet individually, and then a centroid or average of a cluster of all code snippet embeddings used as the embedding representing the higher level task.

Multiple code snippets may then be returned when a match on an embedding is found that matches each of the multiple code snippets. A user may then execute search queries against the database to search for multiple code snippets according to a search query.

At step 1301, a search query is received that may include keywords, natural language queries, or both. In some embodiments, the search query may be pre-processed at step 1302 to put the search query into a standard form. For example, punctuation present in the search query may be removed or a search query may be put into a standard capitalization format.

At step 1303, the search query is input into a natural language neural network encoder and an embedding of the search query is received from the natural language neural network encoder. Next, at step 1304, the database of code snippets and their embeddings is evaluated to identify a set of embeddings of multiple code snippets that are close to the embedding of the search query in the tensor space. For example, code snippet embeddings that are within a threshold distance of the search query embedding may be selected as responsive to the search query. The distance between embeddings in the joint embedding space may be determined by a similarity measure such as cosine similarity. Code snippets may contain references or links to other code snippets, or matching embeddings, to indicate a relationship between the code snippets. In this way, the evaluation of the embeddings may result in identifying a set of related code snippets that go together. The code snippets may be non-contiguous and may be in different files. At step 1305, the search results are ranked according to their distance from the search query embedding and returned for display and usage. Each search result may comprise multiple code snippets that are related, such as for performing different aspects of the same task.

In some embodiments, a search query may be decomposed into a collection of search queries prior to searching. For example, the search query "add new column to database table" may be comprised of subqueries "add column to model", "generate migration file", and "run migration." To map a complex search query to a set of constituent subqueries, a corpus of source code is evaluated to build topic models reflecting hidden semantic structures relating various code snippets within the source code corpus. The constituent subqueries may each be run to obtain search results for the overall search query. The sub-results of the individual subqueries are then combined together as a response to the original query. In some embodiments, the subqueries are made explicit to the user and the sub-results for each subquery are grouped together. In some embodiments, one or more sub-results from each subquery are selected and then grouped together with one or more sub-results from all other subqueries as a singular response to the original query. For example, all sub-results from local code may be grouped together and then sent as a single result to the original search query.

I. Searching for Code Paths

Figure 14:
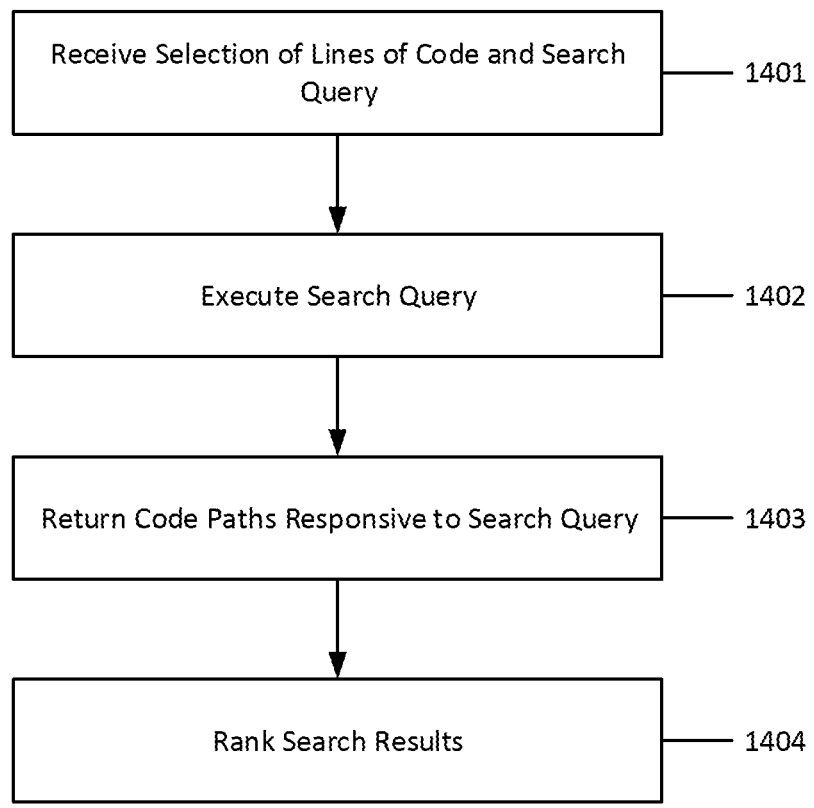
FIG. 14 illustrates the steps of a method for searching for code paths based on keywords according to an embodiment.

FIG. 14 illustrates the steps of a method for searching for code paths based on selection of code combined with keywords according to an embodiment. A selection of code may be any region of code, including a single token, multiple tokens, a line, multiple continuous lines, multiple non-contiguous lines, a file, or multiple files, for example. A database or corpus of code snippets is first indexed according to one or more indexing methods as described above. A user may then execute search queries against the database to search for code paths according to a search query. Code paths are sequences of execution of lines of code of a program. Code paths may be displayed to the user as lists or sequences of lines of source code.

At step 1401, a selection of one or more lines of code and a keyword search query is received. The one or more lines of code may be contiguous or non-contiguous lines of code. A keyword search query may include a single keyword, an unordered plurality of keywords, an ordered plurality of keywords, a plurality of keywords related by Boolean search term operators, a segment of natural language text, or a combination thereof. For example, in one embodiment of a user interface, a selection of one or more lines of code is received in an editor, and the editor displays a pop up text entry field for receiving one or more keywords from the user. In some embodiments, a search query may be filtered or pre-processed prior to executing a search. For example, in some embodiments, a query expansion routine may be used to find root stems of search terms and include related search terms in the search query.

At step 1402, the search query is executed against the database of indexed code snippets. The database may be pre-processed to facilitate searching, and any indices may be generated to facilitate searching of the database. Any search engine or search methodology may be used to search the database for results pertaining to the search query. For example, a search engine may find all results that have a common keyword associated with them that is present in the search query. In some embodiments, the keywords do not need to match and may be matched based on synonyms, semantic relationships, or other fuzzy matching.

At step 1403, the search engine returns code paths that are responsive to the search query. Multiple code snippets comprising a single sequence of execution may comprise a code path and thus may be returned if one or more elements, such as code snippets, of the code path match the search query. In other words, the code path may have at least some code snippets matching the keywords and the code path may also contain the selected one or more lines of code from the user. At step 1404, the search results including any matching code paths that are responsive to the search query are ranked according to one or more ranking methods such as described herein.

Figure 15:
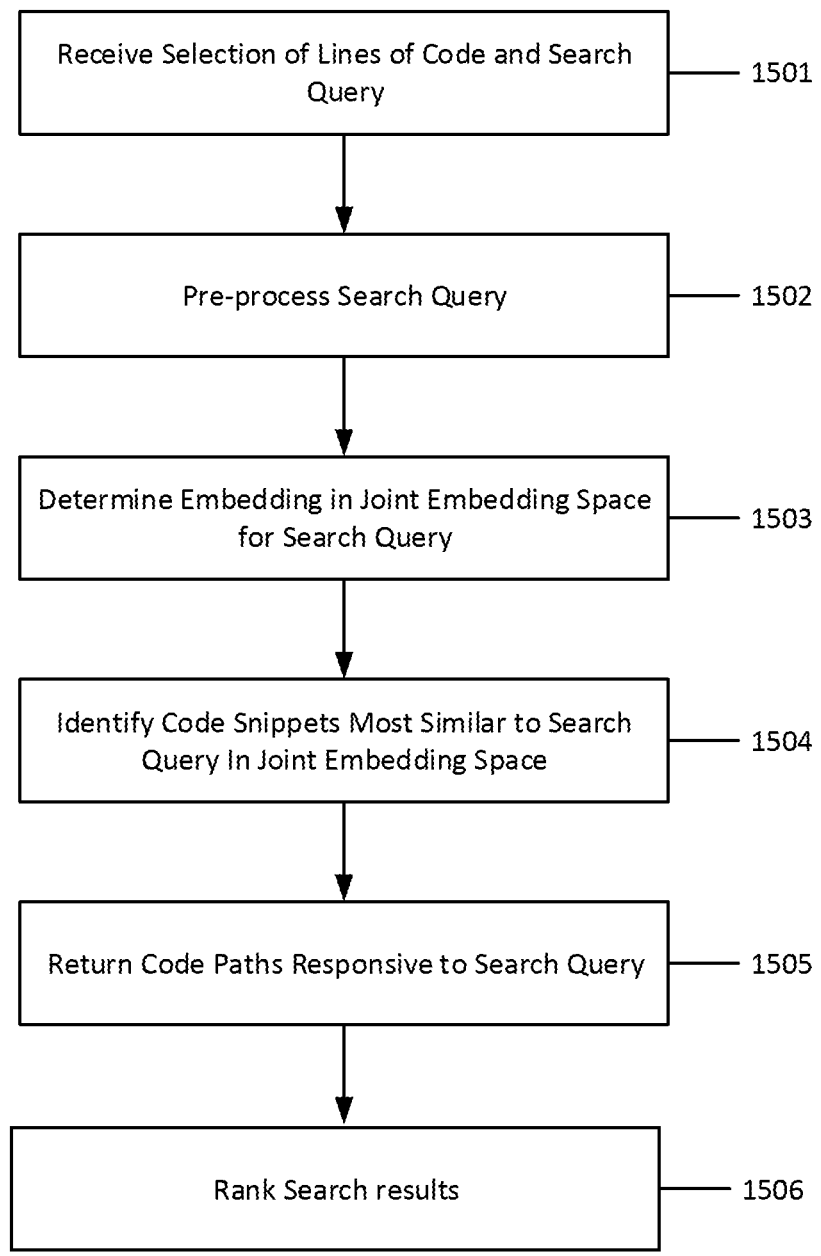
FIG. 15 illustrates the steps of a method for searching for code paths based on embeddings according to an embodiment.

FIG. 15 illustrates the steps of a method for searching for code paths based on selection of a line or lines of code and embeddings according to an embodiment. A database or corpus of code snippets is first processed to determine an embedding of each code snippet in a joint tensor space as described above. A user may then execute search queries against the database to search for code paths according to a search query. Code paths are sequences of execution of lines of code of a program. Code paths may be displayed to the user as lists or sequences of lines of source code.

At step 1501, a selection of one or more lines of code and a search query is received that may include keywords, natural language queries, or both. For example, in one embodiment of a user interface, a selection of one or more lines of code is received in an editor, and the editor displays a pop up text entry field for receiving one or more keywords or natural language queries from the user. In some embodiments, the search query may be pre-processed at step 1502 to put the search query into a standard form. For example, punctuation present in the search query may be removed or a search query may be put into a standard capitalization format.

At step 1503, the search query is input into a natural language neural network encoder and an embedding of the search query is received from the natural language neural network encoder. Next, at step 1504, the database of code snippets and their embeddings is evaluated to identify embeddings of code snippets that are close to the embedding of the search query in the tensor space. For example, code snippet embeddings that are within a threshold distance of the search query embedding may be selected as responsive to the search query. The distance between embeddings in the joint embedding space may be determined by a similarity measure such as cosine similarity.

At step 1505, the search engine returns code paths that are responsive to the search query. Multiple code snippets comprising a single sequence of execution may comprise a code path and thus may be returned if one or more elements, such as code snippets, of the code path match the search query. In other words, the code path may have at least some code snippets matching the embedding and the code path may also contain the selected one or more lines of code from the user. At step 1506, the search results are ranked according to their distance from the search query embedding and returned for display and usage.

J. Ranking of Search Results

In some embodiments, search results from one or more search types may be ordered or ranked for further usage such as display. In some embodiments, a fixed number of search results may be returned. For example, a code entity embedding search engine may identify a top n number of code entity embeddings in a joint embedding space. Ranking may be used to determine a sequential order in which search results including code entities and/or code snippets are presented to a user in a programming environment, such as top to bottom or left to right. In some embodiments, ranking is performed by assigning a score to search results and displaying higher scoring search results before lower scoring search results.

A ranking algorithm may be used that incorporates one or several ranking factors. One factor may be a popularity or relevance of a code storage location the search result is retrieved from. For example, a popularity score of a software library from which a code entity is retrieved may be a factor used in ranking. A popularity score may be retrieved from, for example, a crowd-sourced internet resource measuring a popularity of a software package or library, a download count from an internet resource reflecting a number of downloads of a software package or library, a frequency or count of usages in a corpus of code such as a corpus of open-source code, or any other such metric that may be used as a measurement of reputation or popularity. In an embodiment, code entities and code snippets are scored based on the number of occurrences or the context of occurrence in different codebases. For example, in an embodiment, the appearance of a code entity or code snippet in several different codebases, related to different projects, increases its score.

In some embodiments, the code storage location of a code entity or code snippet in a search result may be used to rank search results. Code may be stored in local storage on a user's local machine, team or company-wide storage, or in a third-party or external code storage location, for example. In one embodiment, personal code storage is scored the most highly, team code storage is scored the second mostly highly, and external code storage is scored the lowest.

In some embodiments, a code entity or code snippet may be ranked according to the context provided by a local development environment. For example, code entities or code snippets may be scored based on appearing in a similar context in their codebase or usage context or may be scored based on having similar code to the programmer's current development environment. In some embodiments, a presence or absence of code entities or code snippets in a user's local code repository may be used to rank search results. For example, if a code entity search result is not found anywhere in a user's local code repository it may be ranked higher than if it were commonly used in the user's local code repository. In this way ranking of search results may promote discovery of new code entities or code snippets to a user. In some embodiments, the context that is measured may include a user's entire local code storage including source code on a local file system and source code in local code repositories. In some embodiments, the context that is measured may include only a portion of local source code that is most often edited by or used by a user. For example, search results that reference code entities in portions of a codebase that the user infrequently accesses may be ranked higher than search results in a portion of the same codebase that a user frequency accesses, further promoting discovery and decreasing redundant search results pertaining to code entities the user is more likely to be familiar with.

In some embodiments, search results may be ranked according to user interactions. For example, search results which are more commonly selected by users searching for similar search terms may be promoted by a higher search result ranking, and search results which are less commonly selected may be demoted by a lower search result ranking. In addition, the length of time that a user spends evaluating a search result may be used for search result ranking.

For example, if a user clicks on a search result and then quickly returns to the list of search results to evaluate a different search result, a click for the search result may be weighted less so than if the user had lingered for a longer time evaluating the search result. If a user then returns to the search interface to perform another search, the quick "reformulation" of the search query may indicate that the original search results were unsatisfactory. These "reformulated" search queries may be recorded and used for learning query expansions related to search terms.

This type of usage data may be gathered on a personal level, such that only a user's own interactions influence rankings in some embodiments. In some embodiments, user interaction from a group of users such as users who work on a common codebase or within the same team may contribute to search ranking results for each of the group of users. Some embodiments may similarly utilize user interaction information to rank search results across a larger segment of users, such as all users of the system. In some embodiments, the context of a user's search such as the codebase a user is working on or the contents of a source code file a user is associated with may be a basis for scoping user interaction feedback. For example, a group of users that all are working in a codebase that references a common software library or component may be grouped and their user interactions pooled to influence search results rankings for each of the users.

In some embodiments, a set of search results may be ranked by diversity criteria. Diversity criteria include any metric of similarity between search results which may be used to ensure a diverse range of search results. For example, promoting diversity in search results may prevent a multitude of similar search results from crowding out other search results. A user may be able to evaluate the relevance of the entire class of similar search results by simply evaluating one representative example of the class, so displaying more than the one representative example may be an inefficient way to present search results. In an embodiment, a clustering algorithm may be used to identify search results which may be redundant in a presentation of search results.

Any measure of similarity between search results may be used as a basis for clustering, such as textual similarity, or programming-language specific measures of source code similarity. For example, a programming-language specific measure of source code similarity may ignore comments, variable names, and white space when determining a measure of similarity between two source code search results. The measure of similarity between search results may be used in any clustering algorithm such as k-means clustering, density based clustering methods such as DBSCAN, or neural network-based clustering, for example.

If a cluster of search results is identified, one of the cluster may be selected as representative of the cluster and displayed in the search results. Any other search results which are in the cluster may be associated with the representative example and accessible in the displayed search results. For example, in some embodiments, a search result display for a representative example of a cluster may include a link or button which links to more search results similar to that search result. In this way, a link or button such as a "see more like this" link may facilitate follow-on searches for similar search results.

K. Multi-Modal Search

Described above in connection with various embodiments are described several different methods of code search such as searching for code entities by keyword, searching for code snippets by keyword, searching for code entities by joint embedding, and searching for code snippets by joint embeddings. In some embodiments, a multi-modal search may be performed on two or more of the above described search methods and the search results from each method combined in a single, unified search result. In some embodiments, the various search results may be ranked separately and displayed under separate headings in a user interface or ranked and displayed jointly. In addition to the ranking criteria disclosed above for each code search method, search result ranking factors may further include ranking by an indication of the search method or modality that produced a search result. Search results may further be ranked higher if they are present in multiple search results from multiple search methods or modalities.

L. Search Suggestions

In some embodiments, search suggestions may be presented when the user is performing a search, such as for code entities, code snippets, multiple code snippets, code paths, or other entities. Search suggestions may be provided by a machine learning model 200 to predict what the user is searching for. The search suggestions may be provided based on a complete or incomplete input from a user.

In an embodiment, search suggestions are provided before a user has completed entry of a search query. The search query may be keywords or natural language text. During typing by the user, the partial input from the user may be input to machine learning model 200 to predict a completion of the search query of the user. The machine learning model 200 may be trained based on prior search queries of the user or other users. The machine learning model 200 may be trained to associate partial inputs from users to the corresponding final input that the users entered. This may be performed by obtaining past inputs from users and dividing the inputs into portions, such as the first one, two, three, or more characters and associating those portions with the completed query. The machine learning model 200 may be trained based on these portions and the completed query as the desired output. The predicted completion of the search query may be output and displayed to the user. In other embodiments, a search may be instantly performed based on the predicted final query and the results displayed to the user. The results may be automatically updated as the additional input is received from the user and the predicted completion changes.

In another embodiment, search suggestions are provided after a user has completed entry of a search query and submitted it. The search query may be keywords or natural language text. Search suggestions may be provided when the user's search query is similar, but not identical, to common search queries that have been received in the past. This may indicate that the user made a mistake or typo in the search query. A machine learning model 200 may be used to identify search suggestions to present after submission of the search query of the user. The machine learning model 200 may be trained based on, for example, a search query entered by a user and a following search query entered soon after, indicating that the user made a correction. In this manner, the machine learning model 200 may learn an association between incorrect search queries and the correct search queries. The machine learning model 200 may display the suggested search query to the user along with search results. The search results may be based on the original search query, which may be incorrect, or may be based on the search engine automatically correcting the search query and running the query based on the corrected version.

M. Scoping of Search Results

In some embodiments, code source locations for searching may be limited to a subset of all available code source locations. In other words, a code search may be scoped to a relevant set of code storage locations. Examples of search scopes may include, for example, locally available source code, source code available in a particular code repository, source code available on a particular network, or source code authored by a particular author or entity, among other such segmentations and divisions of all available source code storage locations.

For example, in some embodiments, an indication of code source locations may be received along with a search query. A user may indicate a desire to search only locally available code storage locations, only external code storage locations, or both, for example. In some embodiments, an explicit identifier of a desired portion of code storage locations may be received along with a search query, such as entered in a graphical user interface by a user performing a search. In other embodiments, a search scope may be inferred from a search query according to a set of heuristics. For example, keywords such as "my," "mine," "local," "in this codebase," or other such indicating terminology in a search query may signal a desire to scope a code search to a particular subset of available code storage locations.

In some embodiments, observed user interactions from previous searches may be used to learn patterns in search queries which correlate to a desired scope. In some embodiments, the same user interactions used to learn ranking of search results may be used to learn patterns in search queries which correlate to a desired scope. By way of example, any of the user interactions from the Ranking of Search Results may be used. For example, if a certain search query term is found to be identified with search results from a particular code storage location, that search query may be learned to be an indicator of a preference to scope a search to that code storage location. In some implementations, a classifier such as a Bayesian network or a support vector machine may be used to learn associations between search scope and search query terms based on observed user interactions. In some implementations, a neural network may be trained to learn the associations between search scope and search query terms based on observed user interactions.

In some embodiments, search results, whether code entities or code snippets, may be filtered according to a plurality of criteria. In one embodiment, search results may be filtered according to a user-defined context such as a line of code. For example, a search a search may be performed for only code sources which intersect a defined segment of code such as a line of code. In an embodiment, a line of code may be highlighted and selected as the base of a search, for example. The keyword or natural language search would then be performed on only code that is related to the defined segment of code. In some implementations, a corpus of all code which intersects the defined segment of code is first identified, indexed, and then searched according to the methods described above. In some implementations, a general corpus of indexed code is searched according to methods described above, and then filtered by a measure of proximity or relatedness to the defined segment of code.

N. Computing Environment

Figure 16:
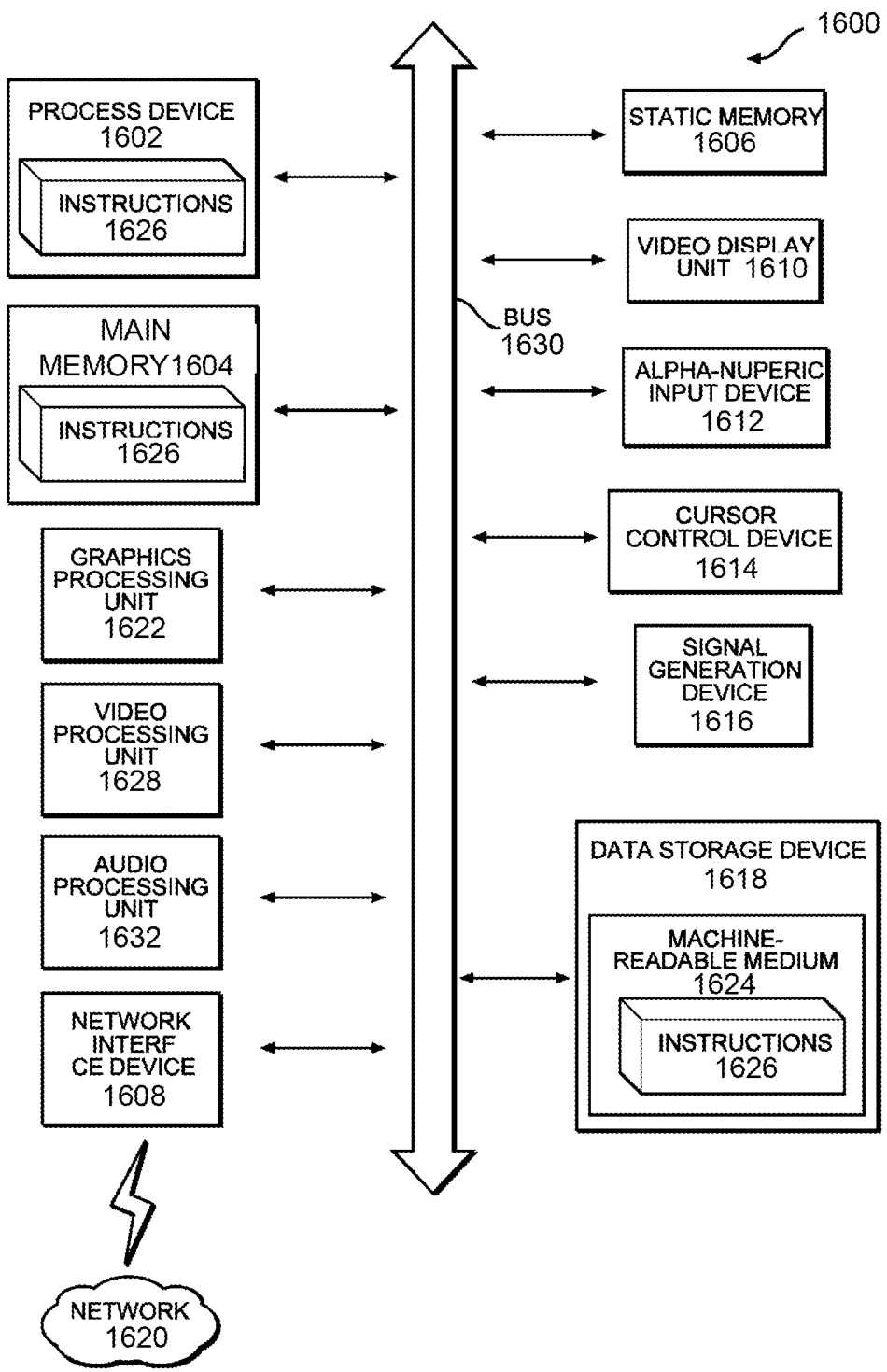
FIG. 16 illustrates an example machine of a computer system within which a set of instructions, for causing the machine to perform any one or more of the methodologies discussed herein, may be executed.

FIG. 16 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1600 includes a processing device 1602, a main memory 1604 (e.g., read-only memory (ROM), flash memory, dynamic random access memory (DRAM) such as synchronous DRAM (SDRAM) or Rambus DRAM (RDRAM), etc.), a static memory 1606 (e.g., flash memory, static random access memory (SRAM), etc.), and a data storage device 1618, which communicate with each other via a bus 1630.

Processing device 1602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1602 may also be one or more special-purpose processing devices such as an application specific integrated circuit (ASIC), a field programmable gate array (FPGA), a digital signal processor (DSP), network processor, or the like. The processing device 1602 is configured to execute instructions 1626 for performing the operations and steps discussed herein.

The computer system 1600 may further include a network interface device 1608 to communicate over the network 1620. The computer system 1600 also may include a video display unit 1610 (e.g., a liquid crystal display (LCD) or a cathode ray tube (CRT)), an alphanumeric input device 1612 (e.g., a keyboard), a cursor control device 1615 (e.g., a mouse), a graphics processing unit 1622, a signal generation device 1616 (e.g., a speaker), graphics processing unit 1622, video processing unit 1628, and audio processing unit 1632.

The data storage device 1618 may include a machine-readable storage medium 1624 (also known as a computer-readable medium) on which is stored one or more sets of instructions or software 1626 embodying any one or more of the methodologies or functions described herein. The instructions 1626 may also reside, completely or at least partially, within the main memory 1604 and/or within the processing device 1602 during execution thereof by the computer system 1600, the main memory 1604 and the processing device 1602 also constituting machine-readable storage media.

In one implementation, the instructions 1626 include instructions to implement functionality corresponding to the components of a device to perform the disclosure herein. While the machine-readable storage medium 1624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
identifying a first code entity in a first portion of source code, the first code entity comprising a logical division of the source code; and
determining one or more keywords for a second code entity, the second code entity comprising a logical division of the source code, wherein the identified first code entity refers to the second code entity, the determined keywords of the second code entity being associated with the first code entity without including a portion of the second code entity in a body of the first code entity;
receiving a search query, the search query comprising a code entity search criteria;
performing a search over a set of candidate items in an index of the determined one or more keywords;
returning, via the search, a set of result items, the set of result items comprising source code related to the first code entity, and
ranking the determined keywords based on code storage location with personal code storage ranked highest and external code storage ranked lowest.

2. The computer-implemented method of claim 1, wherein the candidate items comprise code snippets.

3. The computer-implemented method of claim 2, wherein one or more of the code snippets comprise multiple non-contiguous portions of code.

4. The computer-implemented method of claim 1, wherein the candidate items comprise code paths.

5. The computer-implemented method of claim 4, wherein the code paths indicate paths of code execution or data flow.

6. The computer-implemented method of claim 1, wherein the search comprises a multi-modal search of candidate items comprising at least two different types, the two different types comprising code locations, code entities, code snippets, or code paths.

7. The computer-implemented method of claim 1, wherein the search query comprises one or more keywords and context of a development environment of a user.

8. The computer-implemented method of claim 7, wherein the context comprises a programming language.

9. The computer-implemented method of claim 1, further comprising:
training a search engine based on data from past search usage;
wherein the search is performed by the search engine.

10. The computer-implemented method of claim 9, wherein the past search usage comprises clicks on result items, relative frequency of short and long clicks on result items, or frequency of search query reformulation.

11. The computer-implemented method of claim 9, wherein the search is personalized based on past activities of the user including a length of time the user spends evaluating a search result.

12. The computer-implemented method of claim 1, further comprising selecting result items to return based on increasing a measure of diversity in the set of result items to prevent similar search results from dominating other search results.

13. The computer-implemented method of claim 1, wherein ranking the determined keywords comprises ranking the determined keywords based on at least one of a popularity score, a context score, a user interaction history, or a diversity criterion.

14. The computer-implemented method of claim 1, wherein the search comprises semantic analysis of code.

15. The computer-implemented method of claim 14, wherein the search further comprises determining a similarity between an embedding associated with the search query and one or more embeddings associated with the candidate items.

16. The computer-implemented method of claim 15, wherein the candidate items comprise code locations, the code locations comprising locations in one or more code files.

17. The computer-implemented method of claim 15, wherein the candidate items comprise code entities.

18. The computer-implemented method of claim 15, wherein the search query comprises one or more keywords.

19. The computer-implemented method of claim 15, wherein the search query comprises one or more keywords and one or more code points of interest.

20. The computer-implemented method of claim 19, wherein the code points of interest comprise code entities or lines of code.

21. The computer-implemented method of claim 15, further comprising training one or more neural network encoders to produce an embedding for the search query and one or more of the candidate items.

22. The computer-implemented method of claim 15, wherein the similarity is measured using a distance metric.

23. The computer-implemented method of claim 15, wherein the search comprises a multi-modal search of candidate items comprising at least two different types, the two different types comprising code locations, code entities, code snippets, or code paths.

24. The computer-implemented method of claim 1,
wherein ranking the determined keywords comprises ranking the determined keywords based on a frequency that the keyword appears in the first code entity.

25. The computer-implemented method of claim 1, further comprising:
parsing a source definition of the identified first code entity, and using at least some tokens or references to the second code entity to select keywords related to the identified first code entity.

* * * * *